United States Patent
Kim et al.

(10) Patent No.: US 9,320,025 B2
(45) Date of Patent: Apr. 19, 2016

(54) METHOD AND APPARATUS FOR PERFORMING RANDOM ACCESS PROCEDURE IN A MOBILE COMMUNICATION SYSTEM

(71) Applicant: Samsung Electronics Co., Ltd., Gyeonggi-do (KR)

(72) Inventors: Soeng-Hun Kim, Gyeonggi-do (KR); Gert Jan Van Lieshout, Middlesex (GB); Kyeong-In Jeong, Gyeonggi-do (KR); Himke Van Der Velde, Middlesex (GB)

(73) Assignee: Samsung Electronics Co., Ltd., Samsung-ro, Yeongtong-gu, Suwon-si, Gyeonggi-do (KR)

( * ) Notice: Subject to any disclaimer, the term of this patent is extended or adjusted under 35 U.S.C. 154(b) by 278 days.

(21) Appl. No.: 13/772,960

(22) Filed: Feb. 21, 2013

(65) Prior Publication Data
US 2013/0170453 A1     Jul. 4, 2013

Related U.S. Application Data

(62) Division of application No. 12/187,735, filed on Aug. 7, 2008, now Pat. No. 8,406,179.

(30) Foreign Application Priority Data

| | | |
|---|---|---|
| Aug. 7, 2007 | (KR) | 10-2007-0079270 |
| Nov. 6, 2007 | (KR) | 10-2007-0112879 |
| Jan. 4, 2008 | (KR) | 10-2008-0001244 |
| Feb. 5, 2008 | (KR) | 10-2008-0012001 |

(51) Int. Cl.
H04W 72/04  (2009.01)
H04W 74/00  (2009.01)
H04W 74/08  (2009.01)

(52) U.S. Cl.
CPC ........ H04W 72/0413 (2013.01); H04W 74/002 (2013.01); H04W 74/0833 (2013.01); H04W 74/0866 (2013.01)

(58) Field of Classification Search
None
See application file for complete search history.

(56) References Cited

U.S. PATENT DOCUMENTS

| | | | |
|---|---|---|---|
| 6,760,303 B1 | 7/2004 | Brouwer | |
| 8,243,666 B2 * | 8/2012 | Torsner et al. | ............... 370/329 |
| 2005/0135416 A1 | 6/2005 | Ketchum et al. | |
| 2007/0195747 A1 | 8/2007 | Attar et al. | |
| 2010/0067498 A1 | 3/2010 | Lee et al. | |

FOREIGN PATENT DOCUMENTS

| | | |
|---|---|---|
| EP | 1274203 A1 | 1/2003 |
| WO | 2007-078165 A1 | 7/2007 |

* cited by examiner

*Primary Examiner* — Rhonda Murphy
(74) *Attorney, Agent, or Firm* — Cha & Reiter, LLC.

(57) ABSTRACT

A method for performing a random access procedure by a User Equipment (UE) in a mobile communication system includes transmitting a preamble for identifying the UE, through a first message; receiving a second message from an Evolved Node B (ENB) in response to the first message, the second message including uplink (UL) transmission resource information for transmitting at least one of a transparent Radio Resource Control (RRC) message which is an RRC message that a UE having no RRC control connection transmits for the first time, and Buffer Status Report (BSR) information indicating an amount of UL data; setting a format indicator indicating if the transparent RRC message or the BSR information is included in a third message; and generating the third message according to the set format indicator, and transmitting the generated third message according to the UL transmission resource information.

20 Claims, 16 Drawing Sheets

METHOD AND APPARATUS FOR PERFORMING RANDOM ACCESS PROCEDURE IN A MOBILE COMMUNICATION SYSTEM

CROSS RELATED APPLICATION AND CLAIM OF PRIORITY

This application is a divisional application of U.S. patent application Ser. No. 12/187,735, which claims the benefit of the earlier filing date, under 35 U.S.C. §119(a), to those patent applications filed in the Korean Intellectual Property Office on Aug. 7, 2007 and assigned Serial No. 2007-79270, on Nov. 6, 2007 and assigned Serial No. 2007-112879, on Jan. 4, 2008 and assigned Serial No. 2008-1244, and on Feb. 5, 2008 and assigned Serial No. 2008-12001, the disclosures of all of which are incorporated herein by reference.

BACKGROUND OF THE INVENTION

1. Field of the Invention

The present invention relates to mobile communication systems and more particularly to a method and apparatus for performing a random access procedure in a mobile communication system.

2. Description of the Related Art

In Long Term Evolution (LTE) whose standardization work is being conducted in $3^{rd}$ Generation Partnership Project (3GPP) as one of the next generation mobile communication systems, an Evolved Node B (ENB) takes charge of scheduling downlink (DL) and uplink (UL) traffics. In the communication system where the ENB takes charge of the scheduling, a procedure for transmitting UL data includes the following five steps.

Step 1: A User Equipment (UE) transmits to an ENB a signal indicating generation of UL data.

Step 2: The ENB allocates transmission resources to the UE so that it can report information on the generated data, for example, the amount or priority of the data.

Step 3: The UE sends to the ENB a Buffer Status Report (BSR) message in which the amount and priority information of the data stored in its buffer is contained.

Step 4: Based on the BSR message, the ENB allocates transmission resources necessary for actual data transmission to the UE.

Step 5: The UE transmits data using the allocated transmission resources.

With reference to FIG. 1A, a description will now be made of a process in which a UE makes a buffer status report by sending a scheduling request message to an ENB in an LTE system.

The message that the UE sends in Step 1 is referred to as a scheduling request message, the resources over which the scheduling request message are called scheduling request transmission resources (or scheduling request resources), and the periodically repeated scheduling request resources can be allocated to a UE in the state where its Radio Resource Control (RRC) connection is set up. For example, particular transmission resources can be given to a particular UE as scheduling request transmission resources every 10 msec. When there is a need for data transmission over UL, a UE 105 that has the periodically-existing scheduling request transmission resources sends a scheduling request message to an ENB 110 through the scheduling request resources in step 115.

The scheduling request message can be expressed with a single bit of (1-bit) information, and the UE 105 requests transmission resource allocation for buffer status report using the 1-bit information. In step 120, the ENB 110 sends a UL grant message to allocate to the UE 105 as many transmission resources as the UE 105 may send in a BSR message for a buffer status report. In step 125, the UE 105 sends the BSR message containing the type and size of the generated data to the ENB 110 through the transmission resources allocated in step 120 through the UL grant message.

Based on the BSR message, the ENB 110 estimates priority of the data, and allocates transmission resources to the UE 105 at an appropriate time so that it can transmit UL data, taking into account both the channel state of the UE 105 and the traffic condition of the current cell.

FIG. 1B is a diagram illustrating an example of a BSR message used in an LTE system.

The BSR message, since it is a Medium Access Control (MAC) control message made by a MAC layer, is a kind of a MAC control Service Data Unit (SDU), and is contained in a normal MAC Packet Data Unit (PDU) 140 before being transmitted. The MAC PDU 140 is generated with a MAC header 130 and a MAC SDU 135, The MAC header 130 contains the type and size of the MAC SDU 135. The terms 'PDU' and 'SDU' refer to the data that underwent a particular operation in an arbitrary protocol device, and when the data generated in an upper layer is delivered to an arbitrary protocol device, the upper layer data is called 'SDU'. Similarly, when the protocol device generates its own control information, the control information is also called 'SDU'. However, the SDU, to which a predetermined protocol header is added, is called 'PDU'.

Since the ENB cannot allocate scheduling request resources to all UEs to which it has RRC connections, the ENB allocates no scheduling request resource to the UEs having a lower frequency of data transmissions. Since the only UL channel that the UE can use, which is not allocated scheduling request resource evens though its RRC connection has been set up, is a random access channel, the UE which is not allocated scheduling request resource sends a BSR message to the ENB through a random access procedure. However, no definition has been given of a method in which the UE in the state where its RRC connection is set up sends a BSR message to the ENB through the random access procedure.

SUMMARY OF THE INVENTION

An aspect of the present invention is to provide a method and apparatus by which a UE, which is allocated no scheduling request resource even though its RRC connection has been set up, sends a Buffer Status Report (BSR) message to an ENB through a random access procedure, and the ENB receives the BSR message.

Another aspect of the present invention is to provide a method and apparatus by which a UE, which is allocated no scheduling request resource even though its RRC connection has been set up, sends a BSR message to an ENB through a random access procedure, and the ENB receives the BSR message from the UE.

Another aspect of the present invention is to provide a method and apparatus for transmitting and receiving messages used for performing a random access procedure between a UE and an ENB.

According to one aspect of the present invention, there is provided a method for performing a random access procedure by a User Equipment (UE) in a mobile communication system. The method includes transmitting a preamble for identifying the UE, through a first message, receiving a second message from an Evolved Node B (ENB) in response to the first message, the second message including uplink (UL) transmission resource information for transmitting at least one of a transparent Radio Resource Control (RRC) message which is an RRC message that a UE having no RRC control connection transmits for the first time, and Buffer Status Report (BSR) information indicating an amount of UL data, setting a format indicator indicating if the transparent RRC message or the BSR information is included in a third message, generating the third message according to the set format indicator, and transmitting the generated third message according to the UL transmission resource information.

According to another aspect of the present invention, there is provided a method for performing a random access procedure by a User Equipment (UE) in a mobile communication system. The method includes transmitting a preamble to an Evolved Node B (ENB) through a first message when performing the random access procedure, the preamble including at least one of a size of a third message that the UE will transmit, and information indicating a channel condition, receiving a second message from the ENB in response to the first message, the second message including at least one of uplink (UL) transmission resource information by which the UE will transmit the third message, and a size of the third message designated by the ENB, comparing the size of the third message, designated by the ENB, with a predetermined size, and designating a format of the third message according to the comparison result, and generating and transmitting the third message according to the designated format; wherein based on the format, the third message includes a normal MAC Packet Data Unit (PDU) or a transparent Radio Resource Control (RRC) message which is an RRC message that a UE having no RRC control connection to the ENB transmits for the first time.

According to further another aspect of the present invention, there is provided a User Equipment (UE) apparatus for performing a random access procedure in a mobile communication system. The apparatus includes a physical layer processor for exchanging messages with an Evolved Node B (ENB), a Medium Access Control (MAC) controller for controlling to transmit a preamble to the ENB through a first message, acquiring uplink (UL) transmission resource information from the ENB in response to the first message through a second message that the physical layer processor received from the ENB, the UL transmission resource information being used for transmitting at least one of a transparent Radio Resource Control (RRC) message which is an RRC message that a UE having no RRC control connection transmits for the first time, and Buffer Status Report (BSR) information indicating an amount of UL data, generating a MAC control message containing the BSR information, and outputting a format indicator indicating whether the transparent RRC message or the BSR information is included in a third message which is transmitted using the UL transmission resource information and a MAC multiplexer for multiplexing a MAC control message including at least one of the transparent RRC message delivered from an upper layer and the BSR information delivered from the MAC controller, and generating the third message according to a format indicator designated by MAC controller.

According to yet another aspect of the present invention, there is provided a User Equipment (UE) apparatus for performing a random access procedure in a mobile communication system. The apparatus includes a physical layer processor for exchanging messages with an Evolved Node B (ENB), a Medium Access Control (MAC) controller for controlling to transmit a preamble to the ENB through a first message to perform the random access procedure, the preamble including at least one of a size of a third message that the UE will transmit, and information indicating a channel condition, acquiring at least one of uplink (UL) transmission resource information by which the UE will transmit the third message, and a size of the third message, designated by the ENB, in response to the first message through a second message that the physical layer processor received from the ENB, comparing the size of the third message, designated by the ENB, with a predetermined size, and outputting a format indicator indicating a format of the third message according to the comparison result, and a MAC multiplexer for multiplexing a MAC control message including at least one of a transparent Radio Resource Control (RRC) message delivered from an upper layer and Buffer Status Report (BSR) information delivered from the MAC controller, generating the third message according to a format indicator designated by the MAC controller, and delivering the generated third message to the physical layer processor; wherein the transparent RRC message is an RRC message that a UE having no RRC control connection to the ENB transmits for the first time, and the BSR information indicates an amount of UL data.

According to still another aspect of the present invention, there is provided a method for performing a random access procedure by an Evolved Node B (ENB) in a mobile communication system. The method includes receiving a preamble for identifying a User Equipment (UE), from the UE through a first message, transmitting uplink (UL) transmission resource information through a second message in response to the first message, the UL transmission resource information being used for transmitting at least one of a transparent Radio Resource Control (RRC) message, which is an RRC message that a UE having no control connection transmits for the first time, and a Buffer Status Report (BSR) indicating an amount of UL data, receiving a third message transmitted through the UL transmission resource, checking a format indicator indicating if the received third message includes the transparent RRC message or the BSR, and processing the third message in an RRC layer or a Medium Access Control (MAC) layer according to a set value of the format indicator.

According to still another aspect of the present invention, there is provided a method for performing a random access procedure by an Evolved Node B (ENB) in a mobile communication system. The method includes receiving a preamble from a User Equipment (UE) through a first message, the preamble including at least one of a size of a third message that the UE will transmit, and information indicating a channel condition; transmitting a second message in response to the first message, the second message including at least one of uplink (UL) transmission resource information by which the UE will transmit the third message, and a size of the third message that the ENB wants to receive, receiving the third message transmitted through the UL transmission resource; and processing the third message in a Radio Resource Control (RRC) layer or a Medium Access Control (MAC) layer according to a format of the received third message; wherein the format of the third message is set according to a comparison result between one of the size of the third message that the UE wants to transmit, or the size of the third message that the ENB received, and a predetermined size; wherein based on the format, the third message includes at least one of a normal MAC Packet Data Unit (PDU) and a transparent RRC message which is an RRC message that a UE having no RRC control connection to the ENB transmits for the first time.

According to still another aspect of the present invention, there is provided an Evolved Node B (ENB) apparatus for performing a random access procedure in a mobile communication system. The apparatus includes a Medium Access Control (MAC) controller for receiving a preamble for identifying a User Equipment (UE) from the UE through a first message to perform the random access procedure, transmitting a second message including uplink (UL) transmission resource information to the UE corresponding to the preamble, and processing Buffer Status Report (BSR) information included in a third message received from the UE, a physical layer processor for exchanging the first message, the second message and the third message with the UE and a MAC demultiplexer for checking a format indicator of the third message received from the physical layer processor to determine if the transparent Radio Resource Control (RRC) message is included in the third message or the BSR information is included in the third message, delivering the BSR information to the MAC controller if the BSR information is included in the third message, and delivering the transparent RRC message to a Layer 2 (L2) processor if the transparent RRC message is included in the third message; wherein the transparent RRC message is an RRC message that a UE having no RRC control connection to the ENB transmits for the first time, and the BSR information indicates an amount of UL data.

BRIEF DESCRIPTION OF THE DRAWINGS

The above and other aspects, features and advantages of the present invention will become more apparent from the following detailed description when taken in conjunction with the accompanying drawings in which.

DETAILED DESCRIPTION OF EXEMPLARY EMBODIMENTS OF INVENTION

Embodiments of the present invention will now be described in detail with reference to the drawings. For the purposes of clarity and simplicity, a detailed description of known functions and configurations incorporated herein has been omitted to provide for a clear and concise statement of the invention claimed.

The present invention provides a method and apparatus by which a UE, which is allocated no scheduling request resource even though it is in a connected state, reports its buffer status to an ENB through a random access procedure.

Figure 2:
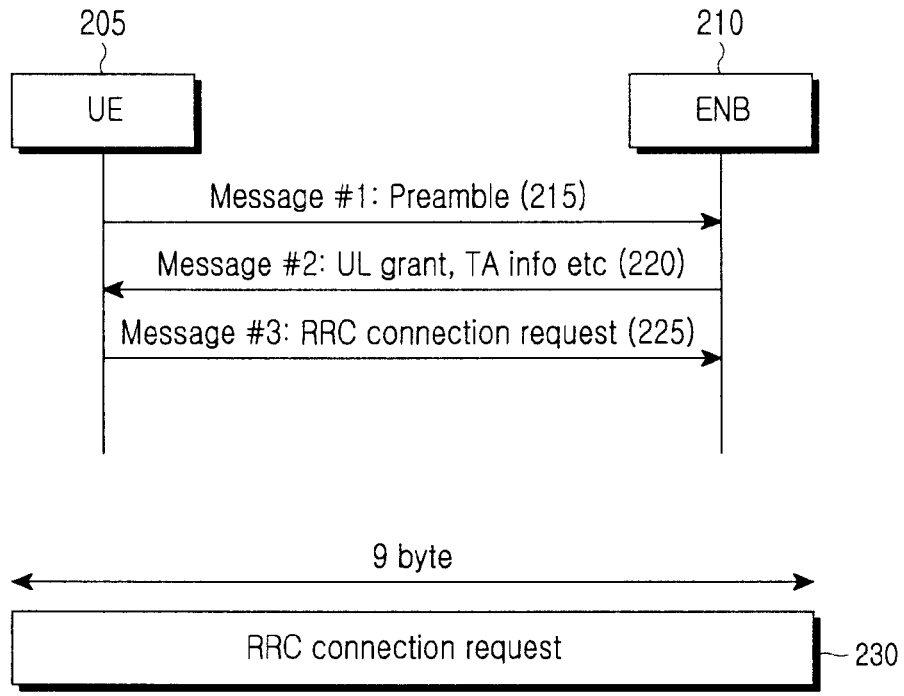
FIG. 2 is a diagram illustrating a random access procedure between a UE and an ENB in an LTE system.

With reference to FIG. 2, a brief description will be made of a random access procedure before a description of embodiments of the present invention is given.

FIG. 2 is a diagram illustrating a random access procedure between a UE and an ENB in an LTE system.

The random access procedure is a process in which a UE 205, in an idle mode, transitions to a connected state where its Radio Resource Control (RRC) connection is set up. The UE 205 establishes UL synchronization through the random access procedure and sends an RRC control message. The RRC control message is a message processed in an RRC layer, and it can be an RRC connection request message in an embodiment of the present invention. The UE 205 in the idle state selects one code from a known code set at a predetermined time, and sends it to a predetermined ENB 210 through predetermined UL transmission resources, as shown by reference numeral 215. This is expressed as 'sending a preamble', and it is sent through a first message, referred to as message #1. As the UE 205 sends a preamble in this way, the ENB 210 can identify the UE that has sent an allocation request for UL resources to the ENB 210. The UE 205 can then establish UL synchronization with the ENB 210. Upon receipt of the message #1 including the preamble transmitted by the UE 205, the ENB 210 sends in step 220 a second message, referred to as message #2, to the UE 205 in response to the message #1, the message #2 containing UL Timing Adjustment (TA) information and UL grant information including therein information on the UL transmission resources over which the UE 205 will send an RRC control message.

In the communication system based on Orthogonal Frequency Division Multiplexing (OFDM), as in LTE, the UL signal transmitted by the UE 205 should arrive at the ENB 210 within a predetermined time period. The ENB 210 calculates a UL TA information (indicating a degree by which it can adjust the scheduled UL transmission time of the UE) for the UE 205 based on the reception time of the preamble transmitted by the UE 205, and the TA refers to a UL TA value of the UE 205.

The UE 205 sends in step 225 a third message, referred to as message #3, including therein an RRC control message to the ENB 210, using the transmission resources allocated in step 220 through the UL grant included in the message #2. Herein, the RRC control message sent in step 225 through the message #3 can be an RRC connection request message. Upon receipt of the RRC control message, the ENB 210 performs a predetermined operation of allowing the UE 205 to transition to the state where its RRC connection is set up. That is, it performs an operation of storing UE-related information and setting up a connection between the upper layer and the UE 205.

The message #3 that the UE 205 sends to the ENB 210 in step 225, is generated and processed in a so-called RRC layer, and is classified as an RRC message. For convenience' sake, the messages exchanged in steps 215 through 225 of the random access procedure are referred to, hereinafter, as message #1, message #2 and message #3, respectively.

The ENB 210 sets a size of the message #3 at a small size since it has no channel state information for the UE 205 that transitions from the idle mode to the connected state. In the standard conference, 9 bytes are now considered as the size of the message #3 as shown by reference numeral 230. In order to provide as much information as possible to the size-limited message, a transparent mode is applied to the RRC connection request message 230 which is an RRC control message sent over the message #3. The term 'transparent mode' as used herein refers to a mode of transmitting only a payload without attaching a header, and it can be used when a reception side can estimate the information that the header should provide, depending on its reception situation.

Figure 1A:
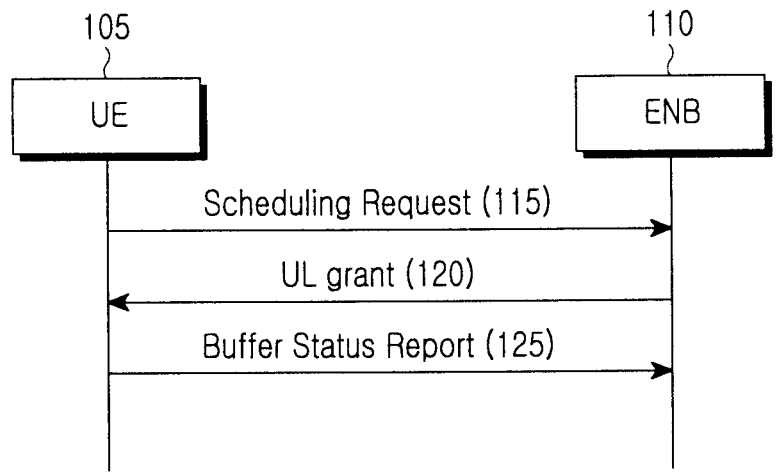
FIG. 1A is signaling diagram illustrating a process in which a UE makes a buffer status report by sending a scheduling request message to an ENB in an LTE system.
Figure 1B:
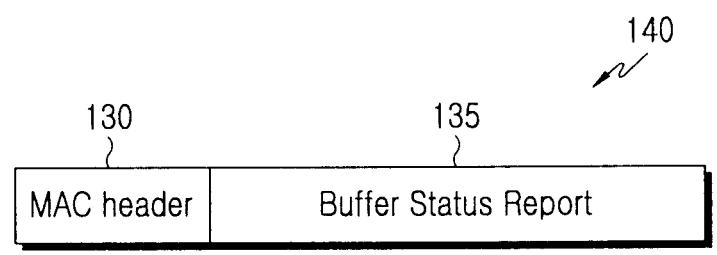
FIG. 1B is a diagram illustrating an example of a BSR message used in an LTE system.

As described above (FIG. 1B), the MAC header 130 contains information indicating the destination and size of the data. The destination of the data indicates in which logical channel or in which layer device the data was generated, and a reception device delivers the data to an appropriate layer device depending on the destination information of the data. If only the RRC connection request message is exchanged through the message #3, the destination information should not necessarily be signaled explicitly, and if only one MAC SDU is contained in the message #3, even the size information of the data should not necessarily be explicitly signaled.

For these reasons, at a recent standards conference, a decision was made to apply the transparent mode to the MAC PDU exchanged through the message #3. In other words, only the RRC control message is transmitted in the message #3 without the MAC header as shown by reference numeral 230.

Figure 3:
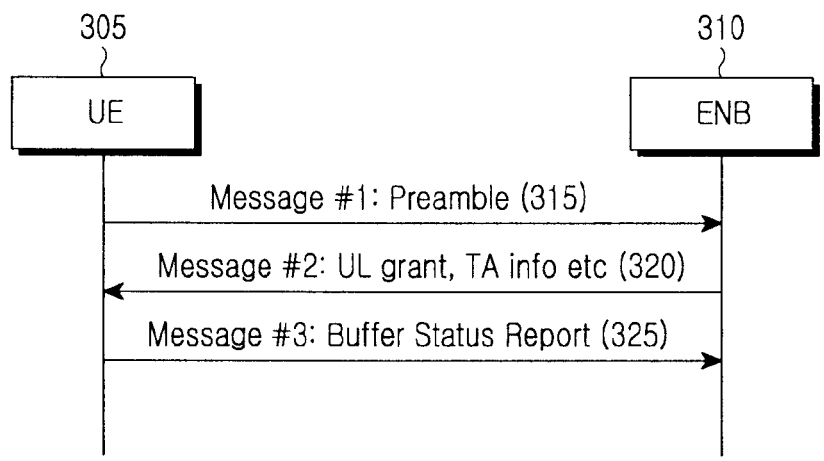
FIG. 3 is a diagram illustrating a process of making a buffer status report through a random access procedure according to an embodiment of the present invention.

FIG. 3 is a diagram illustrating a process of making a buffer status report through a random access procedure according to an embodiment of the present invention.

In FIG. 3, in order to send a Buffer Status Report (BSR) message of a connected-state UE through a random access procedure, a UE 305 selects an arbitrary code and sends a preamble through a message #1 in step 315, and sends, in step 325, a message #3 using transmission resources (UL grant) allocated through the message #2 received from an ENB 310 in step 320. In this case, the message #3 contains a BSR message rather than the RRC control message. Since the UE 305 attaches no MAC header to the MAC PDU transmitted through message #3, the ENB 310 cannot determine whether the MAC PDU received through message #3 is an RRC control message or a BSR message. In other words, since not only the RRC control message but also the BSR message are sent through message #3 transmitted in step 325 of the random access procedure, proper information should be provided so that the reception device can identify the messages.

A description will now be made of a method and apparatus for transmitting and receiving a BSR message through a random access procedure according to first and second embodiments of the present invention. That is, a description will be made of a method and apparatus for transmitting and receiving messages between a UE and an ENB during a random access procedure according to first and second embodiments of the present invention, and a message generation method therefor.

First Embodiment

In a first embodiment of the present invention, as a UE, in transmitting a MAC PDU through a message #3, inserts a MAC header into the MAC PDU, a device, which has received the MAC PDU, can deliver an RRC control message or BSR message contained in the MAC PDU to an appropriate device. The MAC header can be either a normal MAC header, or a MAC header having a shortened format.

Figure 4:
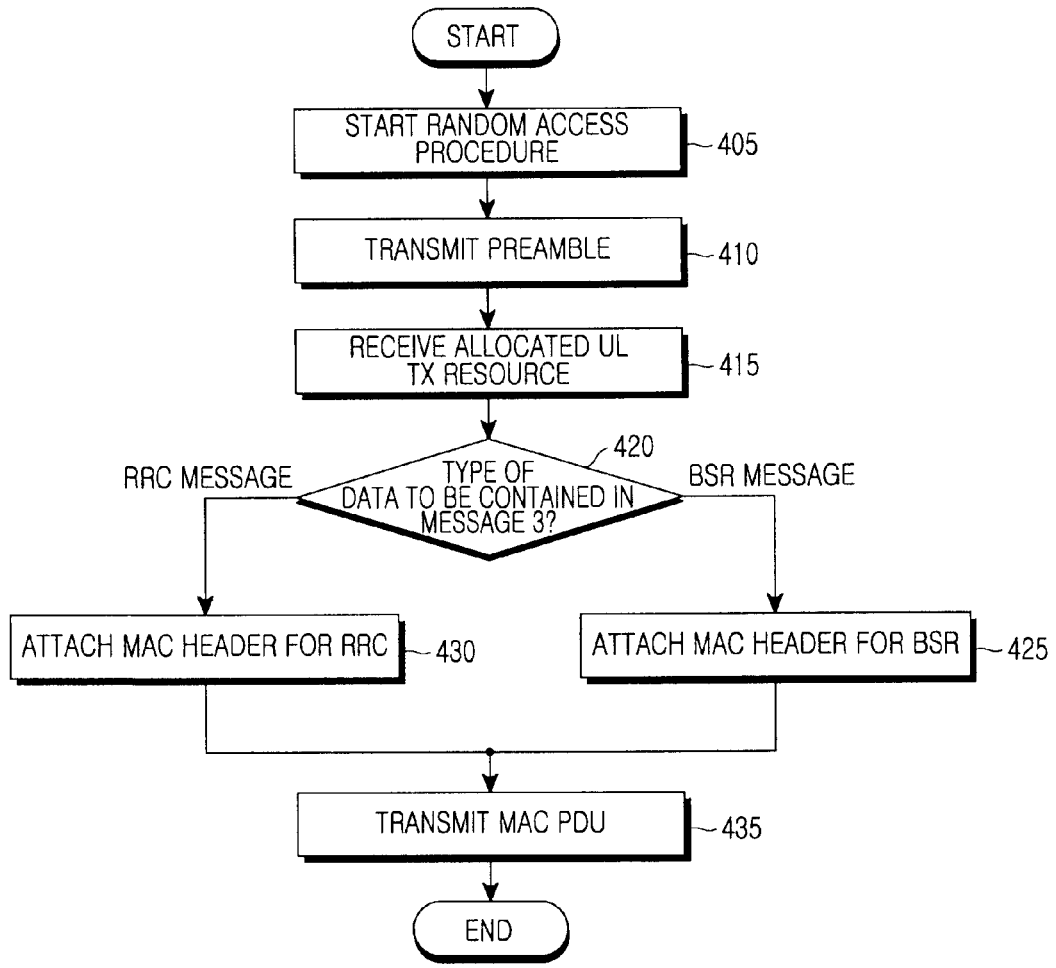
FIG. 4 is a flowchart illustrating an operation in which a UE sends a status report message according to a first embodiment of the present invention.

FIG. 4 is a flowchart illustrating an operation in which a UE sends a status report message according to a first embodiment of the present invention.

In FIG. 4, a message #2 and a message #3 are defined as follows.

Message #2 is a control message containing TA information and allocation information of transmission resources through which a UE will send a UL message in a random access procedure.

Message #3 is a UL message that a UE sends using the UL transmission resources allocated through the message #2 in the random access procedure.

In step 405, the UE starts a random access procedure if UL data is generated in the state where the UE is allocated no scheduling request resource even though there is a need to transition to the connected state for an arbitrary reason, or it is in the connected state.

In step 410, the UE selects any one of a plurality of codes through a predetermined procedure, sends a preamble coded with the selected code, and then monitors a control channel to receive the message #2 from an ENB. The number of code is in a preferred aspect equal to 64 codes.

In step 415, based on the message #2 received from the ENB, the UE is allocated UL transmission resources, and perceives the UL transmission resources over which it will send the message #3.

In step 420, the UE checks a type of the data it will transmit through the message #3. If the message to transmit through the message #3 is an RRC message, the UE proceeds to step 430, and if the message to transmit is a BSR message which is a MAC control message, the UE proceeds to step 425. Although an embodiment of the present invention uses the BSR message as an example of the MAC control message, it can also use other messages processed in the MAC layer.

In step 425, the UE attaches a MAC header to the BSR message. The MAC header includes therein information indicating that the contained data is a MAC control message, i.e., a message which is processed in the MAC layer.

In the first embodiment of the present invention, since the RRC message or MAC control message can be sent through the message #3, the MAC header is needed in order for the reception device to determine whether the RRC message or MAC control message has been received through the message #3.

In step 430, the UE attaches a MAC header to the RRC message. The MAC header includes information indicating that the contained data is a message processed in the RRC layer. Thereafter, in step 435, the UE sends to the ENB the MAC PDU to which the MAC header is attached in step 425 or 430, and performs a predetermined succeeding operation.

Although the MAC header used for the message #3 may have the same format as that of the normal MAC header, it may use a separate format having a size smaller than the normal MAC header for the following reasons.

Figure 5:
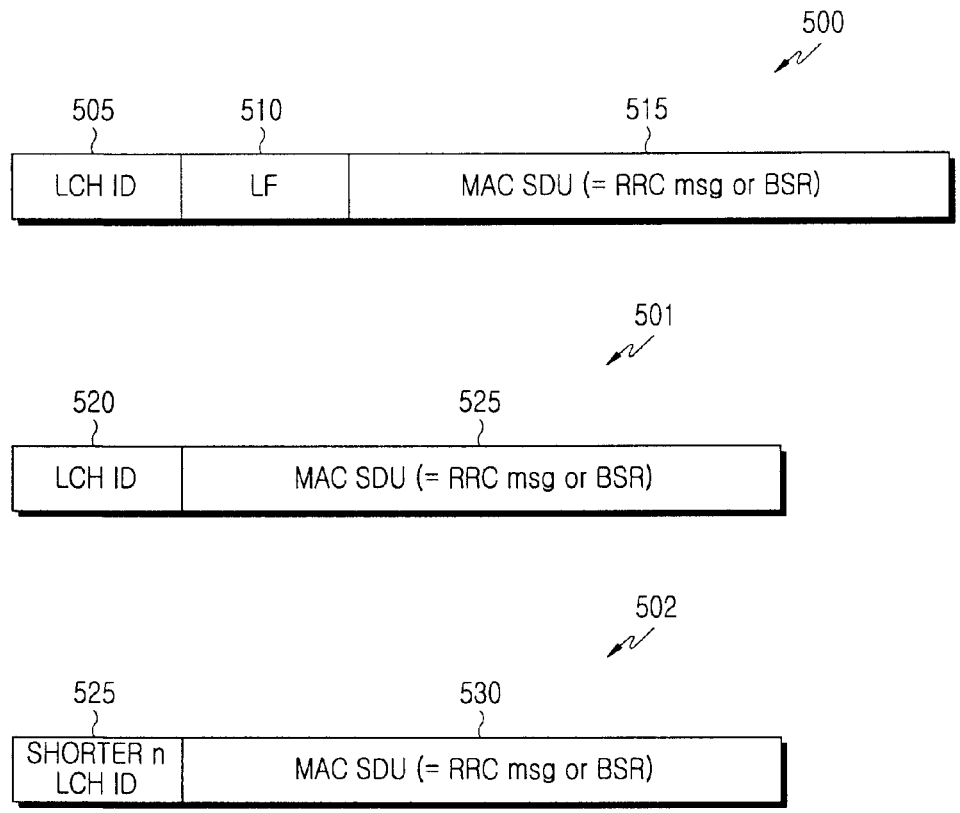
FIG. 5 is a diagram illustrating a format of a third message (#3), received through the third message (#3), according to the first embodiment of the present invention.

FIG. 5 shows three types of MAC PDU formats used for the message #3 according to the first embodiment of the present invention. In the first embodiment of the present invention, the UE and ENB use one of the following three formats.

The format referred to as reference numeral 500 shows a MAC header that is comparable in format to a normal MAC header that can be used for the message #3. In this case, the MAC PDU 500 is composed of a Logical Channel (LCH) ID 505, a Length Field (LF) 510, and a MAC SDU 515. The LCH ID 505 is an identifier of a logical channel to which the MAC SDU 515 contained in the MAC PDU 500 belongs. If the MAC SDU 515 is an RRC message, a logical channel identifier of an RRC processing device is used as the LCH ID 505. If the MAC SDU 515 is a BSR message, a predetermined logical channel identifier designated for MAC control information is used as the LCH ID 505. The LF 510 is information indicating a size of the MAC SDU 515.

The format referred to as reference numeral 501 shows that the optimized MAC header can be used for the message #3. Since only one MAC SDU is always sent through the message #3, the LF is substantially unnecessary information. Shown by reference numeral 501 is a MAC PDU where only an LCH ID 520 is included in the MAC header to reduce overhead, and the LF is omitted. In this case, only the LCH ID 520 and MAC SDU 525 are contained in the MAC PDU 501 which is transmitted over the message #3.

The LCH ID 520 in the MAC PDU 501 may have a size with which it is possible to identify the maximum number of logical channels that can be associated with or set up to one UE. In an aspect of the invention, 5 bits are considered as the size. However, since only two types of data, i.e., RRC message and MAC control message, are transmitted through the message #3, 1 bit is enough to identify them. That is, as shown by the format shown by reference numeral 502, it is also possible to include in the MAC header only a shorter LCH ID field 525 which is information used for identifying a logical channel of a MAC SDU 530 with the 1-bit information. For example, as to the shorter LCH ID field 525, 0 can indicate that an RRC message is contained, and 1 can indicate that a MAC control message is contained. If also other types of messages can be transmitted through the message #3, the shorter LCH ID 525 can be extended according to the type of transmittable data (2, 3, 4, etc. bits).

Figure 6:
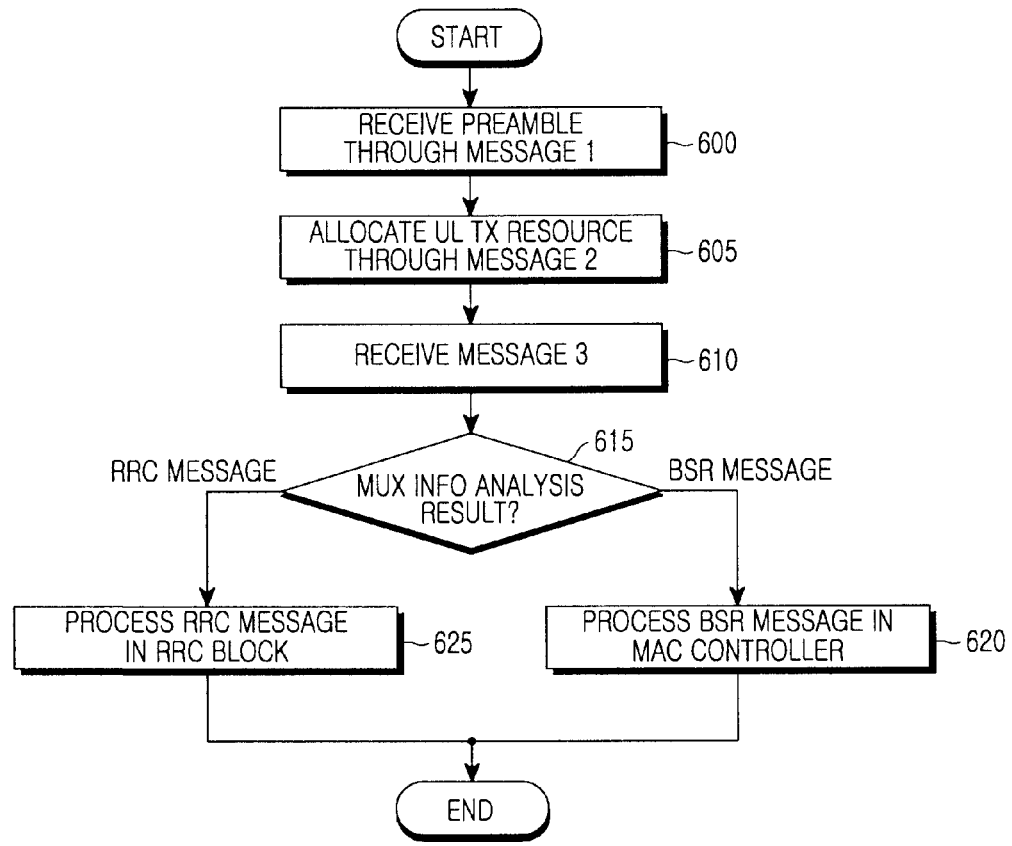
FIG. 6 is a flowchart illustrating an operation in which an ENB receives a buffer status message from a UE according to the first embodiment of the present invention.

FIG. 6 is a flowchart illustrating an operation in which an ENB receives a buffer status message from a UE according to the first embodiment of the present invention.

In step 600, the ENB receives a preamble through a message #1 from a UE that will send a BSR message. In step 605, the ENB sends a message #2 to the UE corresponding to the preamble. In this case, the message #2 contains therein TA information for the UE and UL transmission resource information with which the UE will send the BSR message over UL. In step 610, the ENB receives a message #3 from the UE through the UL resources allocated through the message #2.

Upon receipt of the message #3, the ENB analyzes multiplexing information included in the message #3 in step 615 to check whether an RRC control message is contained in the message #3 or a BSR message which is a MAC control message is contained in the message #3. As described above, the normal multiplexing information format can be used intact as the multiplexing information of the message #3, or the optimized multiplexing information format can be used as the multiplexing information of the message #3. The UE and ENB apply a common multiplexing information format to the message #3.

If it is determined in step 615 that an RRC message is included in the message #3, the ENB proceeds to step 625 where it processes the RRC message by means of an RRC block, and if a BSR message is included in the message #3, the ENB proceeds to step 620 where it processes the BSR message by means of a MAC controller.

Second Embodiment

A second embodiment of the present invention provides a method for transmitting a BSR message after including it in an RRC message instead of transmitting only the RRC message through a message #3.

As a UE, whose RRC connection, a connection having no scheduling request transmission resource, is set up, includes a BSR message in an RRC message in transmitting the BSR message through the message #3, only the RRC message is always contained in the message #3. The use of the second embodiment of the present invention can avoid overhead due to the MAC header by applying a transparent mode to the message #3.

In the second embodiment of the present invention, in transmitting a BSR message, a UE whose RRC connection is set up, first checks availability of scheduling request resources, and sends the BSR message either in the MAC control message or in the RRC message according to the availability of scheduling request resources. That is, if scheduling resources are available, the UE sends the BSR message after including it in the MAC control message, and if scheduling resources are unavailable, the UE sends the BSR message after including it in the RRC message.

Figure 7:
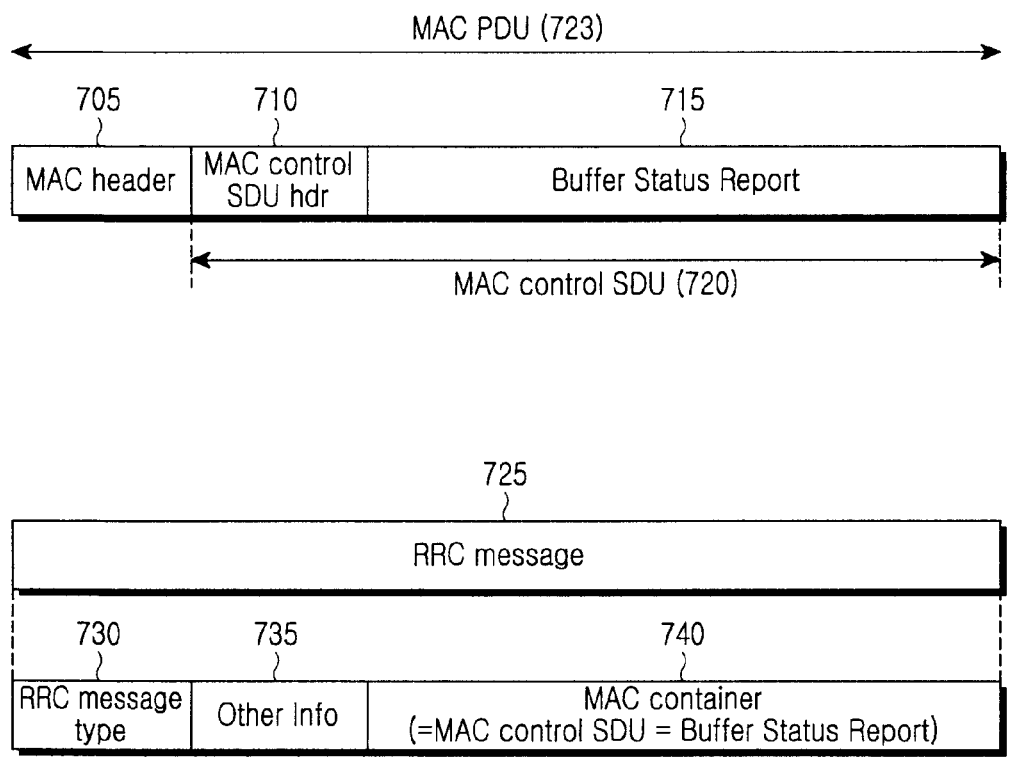
FIG. 7 is a diagram illustrating a format of a BSR message contained in a MAC control message and a format of a BSR message contained in an RRC message according to a second embodiment of the present invention.

FIG. 7 is a diagram illustrating a format of a BSR message contained in a MAC control message and a format of a BSR message contained in an RRC message according to the second embodiment of the present invention.

A MAC control message (MAC control SDU) 720 is composed of a MAC control message header 710 indicating a type of a control message contained in the MAC control message, and a BSR message 715 generated in a predetermined format. The BSR message 715 contains information related to a buffer status of a UE and other information necessary for scheduling, for example, transmission power information available for the UE.

A header 705 of a MAC PDU 723 containing the MAC control message contains multiplexing information for the MAC control message 720. The message format associated with reference numeral 723 does not indicate a MAC PDU according to the second embodiment of the present invention, but indicates a MAC PDU format used for sending a normal buffer status report.

When the BSR message is sent after it is contained in an RRC message 725, the MAC control message (MAC control SDU) is mapped to a predetermined Information Element (IE) of the RRC message 725, which is called a MAC container 740. The term 'IE' as used herein refers to meaningful information constituting an RRC message, and one RRC message is composed of multiple IEs.

When a UE, which is allocated no scheduling request resource even though its RRC connection is set up, reports a BSR message through a message #3 transmission, a predetermined RRC message is contained in the message #3, a MAC control message (MAC control SDU) is contained in an IE of the MAC container 740 of the predetermined RRC message, and a BSR message is contained in the MAC control message. The MAC container 740 is an IE aiming to deliver the information that the MAC layer should process, to the opposing MAC layer through the RRC message 725.

Generally, the IE contained in the RRC message 725 is generated in an RRC block, which is an RRC layer of a transmission side, and analyzed in an RRC block, which is an RRC layer of a reception side. However, the information included in the MAC container 740 is generated not in the RRC block but in a MAC controller, which is a MAC layer of the transmission side, and analyzed in a MAC controller of a MAC layer of the reception side, and in the second embodiment of the present invention, the RRC block only provides a path for transmitting and receiving the MAC container 740 which includes MAC information. Even in the prior art, there is an upper layer container, and it sends an upper layer message after including it in a particular IE of the RRC message 725. However, since the upper layer message is originally transmitted and received via the RRC layer, it is natural to transmit/receive the upper layer message after including it in an upper layer container of an RRC message.

On the other hand, since a direct path referred to as a MAC control message 720 exists for transmission/reception of control information between MAC layers, there is no need, in principle, to define the so-called MAC container. However, when there is a need to send the MAC control message through a path prescribed to transmit/receive only the RRC message 725 like the message #3, it is possible to define the MAC container 740 and transmit/receive the MAC control message through an RRC message after including it in the MAC container 740. By transmitting/receiving the MAC control message through the MAC container 740 in this way, it is possible to avoid adding a separate MAC header to the message #3. In FIG. 7, an RRC message type 730 represents information indicating a type of the RRC message 725, and other information 735 means other IEs contained in the RRC message 725. Since, for each IE, information indicating a type of the IE is explicitly or implicitly included in the RRC message 725, an RRC block of the reception device can identify a MAC container IE in the process of processing IEs of the received RRC message.

Figure 8:
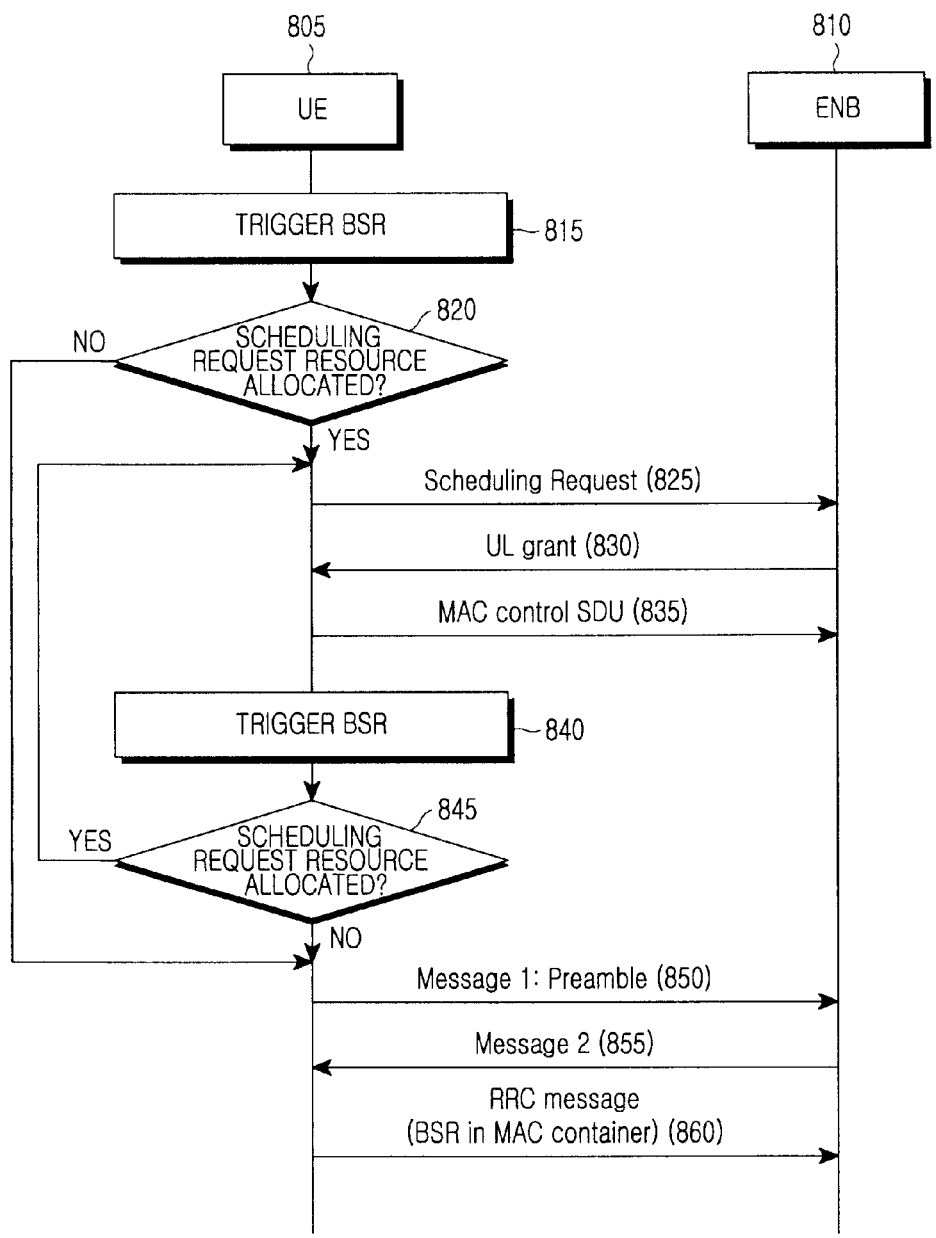
FIG. 8 is a flowchart illustrating a method in which a UE sends a status report message to an ENB according to the second embodiment of the present invention.

FIG. 8 is a flowchart/timing chart illustrating a method in which a UE sends a status report message to an ENB according to the second embodiment of the present invention.

In step 815, a Buffer Status Report (BSR) occurs in a UE 805 at an arbitrary time. The time the BSR occurs in step 815 can include, for example, the occasion where data abruptly occurs in a buffer of the UE 805. In step 820, the UE 805 determines whether there is any scheduling request transmission resource (or schedule request resource) allocated to the UE, and if it is checked that scheduling request transmission resources are allocated, the UE 805 starts the normal BSR procedure.

That is, in step 825, the UE 805 sends a scheduling request message to an ENB 810 through the allocated scheduling request transmission resources. However, if it is checked in step 820 that there is no scheduling request resource allocated thereto, the UE 805 proceeds to step 850 where it sends a status report message through a random access procedure.

Returning to step 825, when the ENB 810, which has received the scheduling request message, allocates in step 830 transmission resources over which the UE 805 will send a status report message, through UL grant message, the UE 805 sends in step 835 a MAC control message (MAC control SDU) containing a BSR message, using the transmission resources allocated with the UL grant message. The MAC control message is generated according to a format of the normal MAC PDU as shown by reference numeral 723 (FIG. 7), and is directly exchanged between a MAC controller of a transmission-side MAC layer and a MAC controller of a reception-side MAC layer. That is, upon receiving the MAC PDU, a MAC controller 1160 (see FIG. 11, as will be discussed) in charge of a MAC layer of the ENB 810 directly processes a MAC control message (MAC control SDU) contained in the MAC PDU.

In step 840, another BSR occurs in the UE 805 at an arbitrary time. In step 845, the UE 805 checks if there is any scheduling request transmission resource allocated thereto. If it is determined in step 845 that the scheduling request transmission resources are released for an arbitrary reason, so there is no scheduling request transmission resource available for the UE 805, the UE 805 starts the random access procedure through steps 850 through 860. However, if it is determined in step 845 that there are scheduling request resources allocated thereto, the UE 805 proceeds to step 825.

However, since the UE 805, for which it is checked in step 845 for which there is no scheduling request resource allocated, should send a BSR message through a random access procedure, the UE 805 selects a preamble code according to a predetermined procedure and sends a preamble in step 850, and is allocated UL transmission resources from the ENB 810 through a message #2 in step 855. Thereafter, in step 860, the UE 805 sends a message #3 through the UL transmission resources allocated through the message #2. In step 860, the UE 805 includes in the message #3 an RRC message according to the second embodiment of the present invention.

Figure 11:
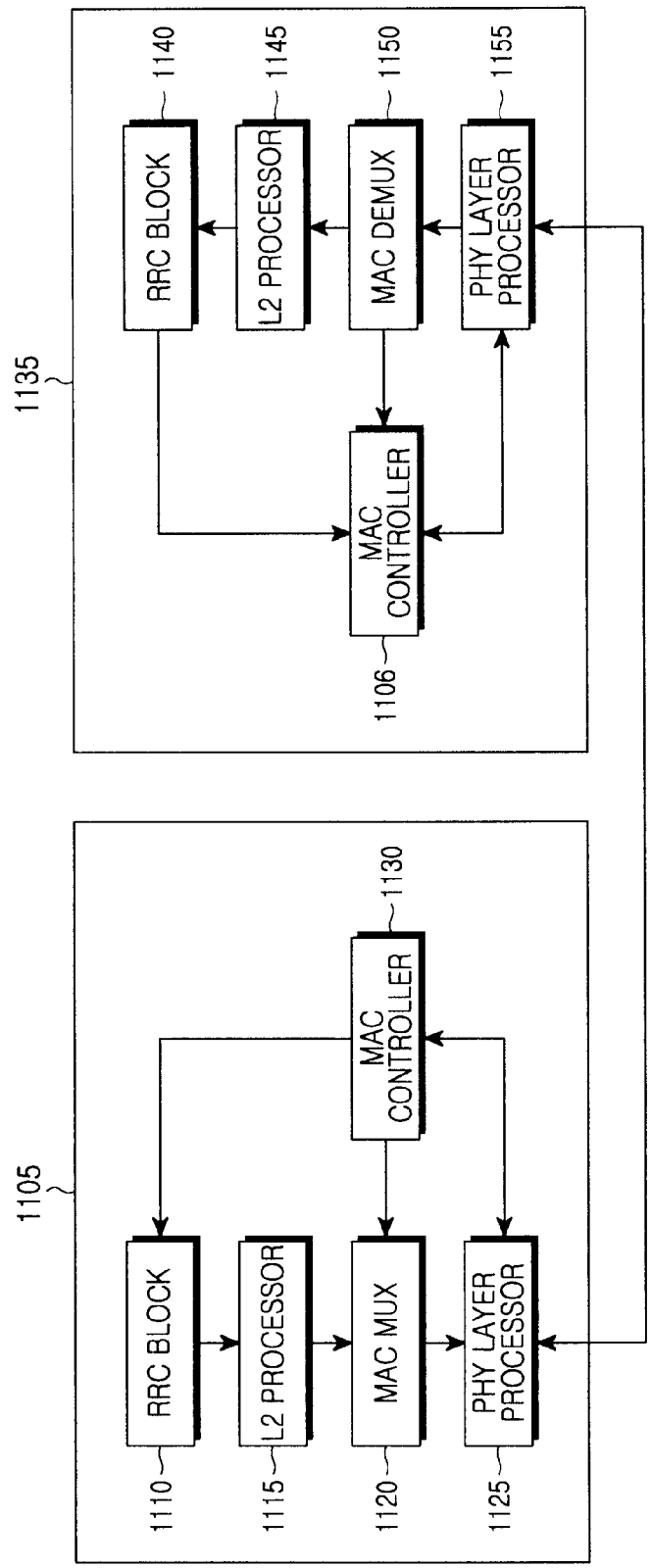
FIG. 11 is a block diagram illustrating structures of a UE and an ENB for transmitting and receiving a BSR message according to an embodiment of the present invention.

The UE 805 includes a MAC container IE containing a BSR message in an RRC message according to the second embodiment of the present invention. Upon receiving the message #3 transmitted by the UE 805 in step 860, a MAC demultiplexer 1150 of the ENB 810 delivers the RRC message contained in the message #3 to an RRC block 1140 (see FIG. 11) via a Layer 2 (L2) processor 1145 (FIG. 11). If a MAC container is included in an IE of the RRC message, it means that a MAC control message is received through the RRC message, so the RRC block 1140 (FIG. 11) extracts a MAC control message (MAC control SDU) from the RRC message and delivers it to the MAC controller 1160 (FIG. 11). Then the MAC controller 1160 (FIG. 11) processes the MAC control message received from the RRC block 1140. In this case, no MAC header is added to the message #3.

Figure 9:
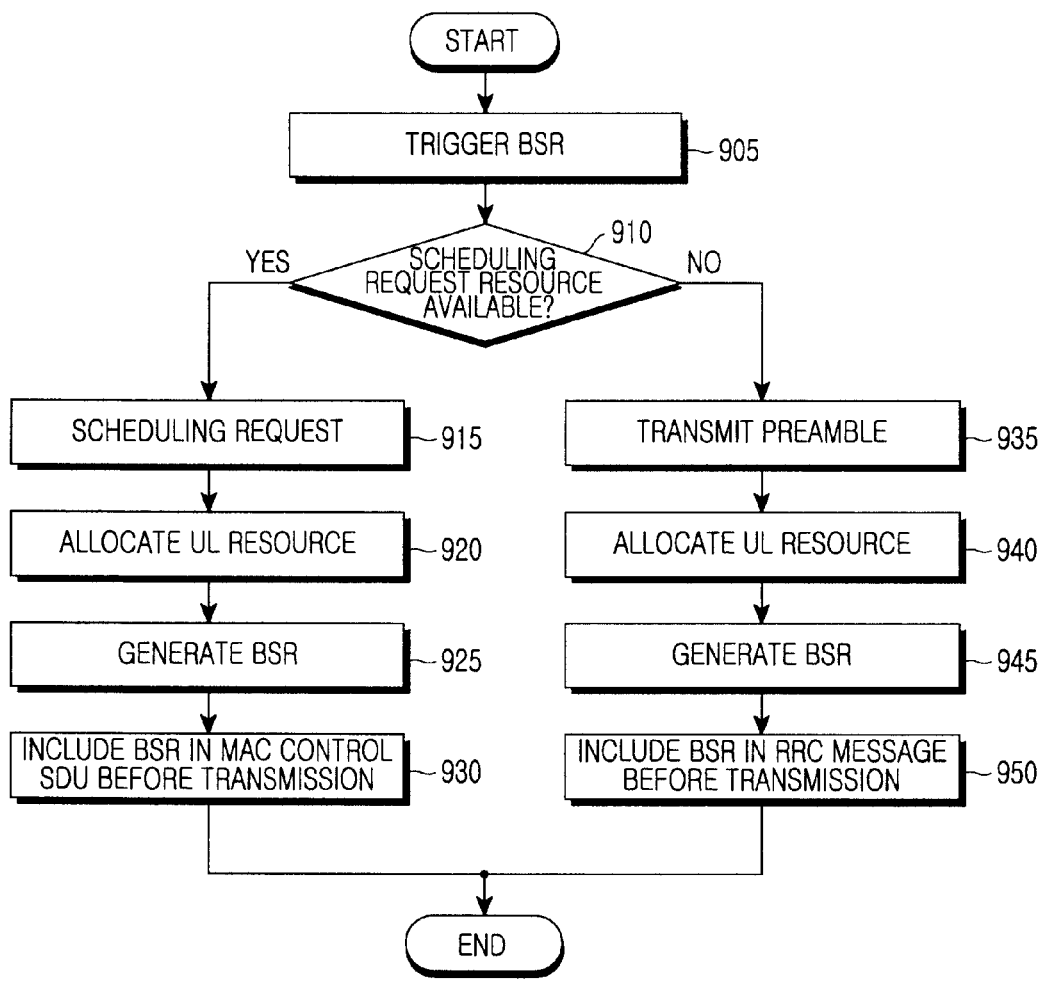
FIG. 9 is a flowchart illustrating a UE's operation of sending a BSR message according to the second embodiment of the present invention.

FIG. 9 is a flowchart illustrating a UE's operation of sending a BSR message according to the second embodiment of the present invention.

In this illustrated process, if a BSR message is generated as a BSR in step 905, the UE checks in step 910 if scheduling request resources are available. If available, the UE proceeds to step 915, and otherwise, proceeds to step 935.

In step 915, the UE starts a normal BSR procedure. That is, in step 915, the UE sends a scheduling request message through the scheduling request resources. If UL transmission resources are allocated in step 920, the UE generates a BSR message in step 925.

The BSR message, i.e., MAC control information having a predetermined format, includes the amount and priority of the data stored in each buffer of the UE, and also includes transmission power information available for the UE. In step 930, the UE includes the BSR message in MAC control information and sends it to an ENB.

However, a UE, for which it is checked in step 910 that there is no available scheduling request resource, proceeds to step 935 where it starts a random access procedure. That is, in step 935, the UE selects a preamble code by applying a predetermined rule and sends a preamble coded with the code associated with the ENB. If the UE is allocated, from the ENB, UL transmission resources for transmission of a message #3 in step 940, the UE generates a BSR message in step 945. In step 950, a MAC controller 1130 (FIG. 11) of the UE delivers the BSR message or a MAC control message containing the BSR message to an RRC block 1110 (FIG. 11) and the RRC block 1110 (FIG. 11) forms a predetermined RRC message to be transmitted through the message #3, and includes a BSR or a MAC control message containing the BSR in a MAC container IE of the RRC message. Thereafter, the UE sends the RRC message containing the MAC container IE to the ENB.

Figure 10:
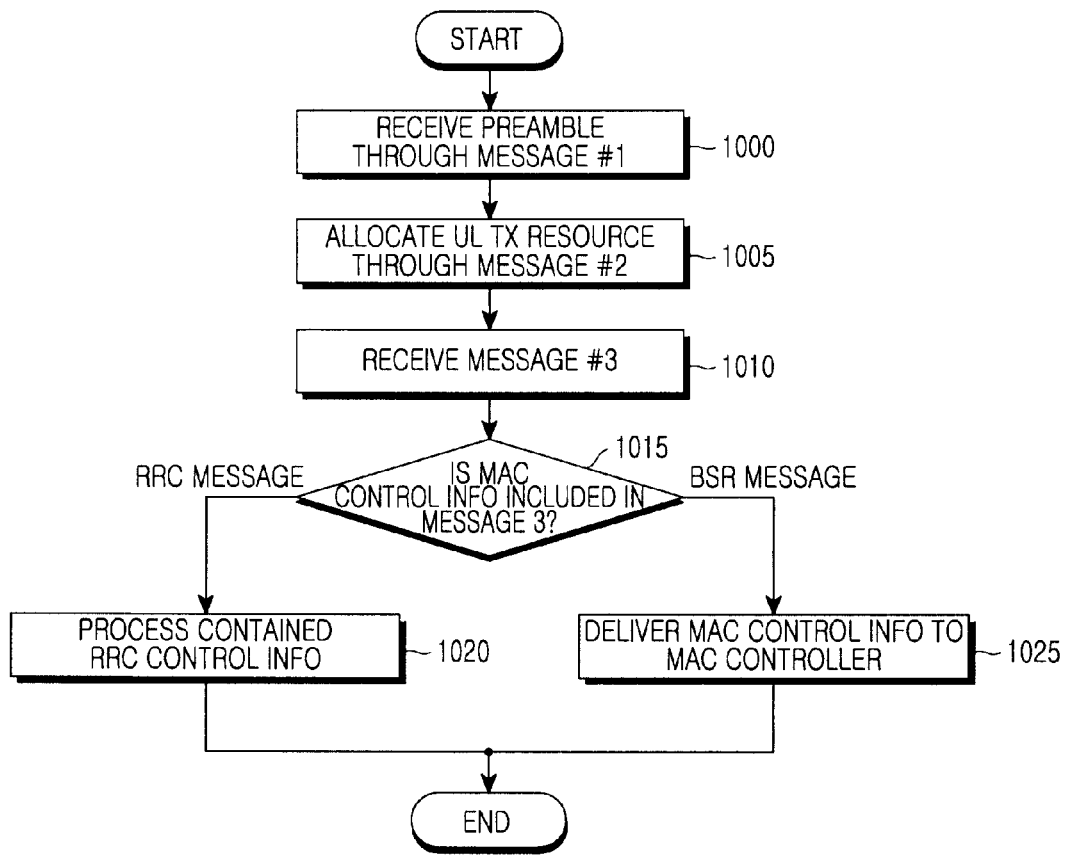
FIG. 10 is a flowchart illustrating an ENB's operation of receiving a BSR message from a UE through a random access procedure according to the second embodiment of the present invention.

FIG. 10 is a flowchart illustrating an ENB's operation of receiving a BSR message from a UE through a random access procedure according to the second embodiment of the present invention.

The ENB receives a preamble from a UE through a message #1 in step 1000, and transmits, through a message #2 in step 1005, UL transmission resource information to the UE corresponding to the preamble received through the message #1. In step 1010, the ENB receives a message #3 that the UE transmitted, through the UL transmission resource information, and a MAC demultiplexer 1150 (FIG. 11) of the ENB delivers the received message #3 to an RRC block 1140 (FIG. 11) via an L2 processor 1145 (FIG. 11) since the received message #3 is an RRC control message that should be processed in an RRC layer. The RRC block 1140 (FIG. 11) of the ENB checks in step 1015 if MAC control information such as a BSR message is included in the message #3.

If it is determined in step 1015 that a MAC control message is included in the message #3, the RRC block 1140 (FIG. 11) of the ENB proceeds to step 1025 where it sends the MAC control message to a MAC controller 1160 (FIG. 11), and the MAC controller 1160 (FIG. 11) performs an appropriate operation by analyzing the MAC control message.

However, if it is determined in step 1015 that no MAC control message is included in the message #3, the RRC block 1140 proceeds to step 1020 where it analyzes the RRC control information contained in the RRC control message and performs an operation appropriate thereto.

FIG. 11 is a block diagram illustrating structures of a UE 1105 and an ENB 1135 for transmitting and receiving a BSR message according to an embodiment of the present invention. A transmission device provided in a UE 1105, includes an RRC block 1110, an L2 processor 1115, a MAC multiplexer 1120, a MAC controller 1130, and a physical layer processor 1125.

The RRC block 1110 is a device for processing a control message related to a radio access network. The RRC block 1110 delivers a BSR message which is a MAC control message delivered by the MAC controller 1130 to its lower layer after including it in an IE called a MAC container of an RRC message as shown in FIG. 7, according to the second embodiment of the present invention. For example, in the first embodiment of the present invention, the RRC block 1110 generates a MAC SDU included in a message #3, and in the second embodiment of the present invention, the RRC block 1110 generates an RRC message including a message #3.

The L2 processor 1115 takes charge of encrypting the RRC message generated by the RRC block 1110 and framing it in a size suitable for transmission over a radio channel. The MAC multiplexer 1120 multiplexes the MAC SDUs provided from the L2 processor 1115 and the MAC control message delivered by MAC controller 1130, forms a MAC PDU by attaching a proper MAC header thereto, and delivers it to the physical layer processor 1125, which is its lower layer. For example, the MAC multiplexer 1120 according to the first embodiment of the present invention multiplexes the MAC SDU containing an RRC message, received from the L2 processor 1115 which is its upper layer, and the MAC SDU including a BSR message, received from the MAC controller 1130. For example, in the second embodiment of the present invention, the MAC multiplexer 1120 multiplexes the RRC message generated in the RRC block 1110.

According to the first embodiment of the present invention, the MAC SDU included in the message #3 is generated in the RRC block 1110, and the MAC header is generated in the MAC multiplexer 1120. The message #3 in the second embodiment of the present invention is generated in the RRC block 1110.

In the first embodiment of the present invention, the MAC multiplexer 1120 attaches a proper MAC header to the MAC SDU transmitted through the message #3 during the random access procedure. If the RRC message is sent through the message #3, i.e., if the MAC SDU is provided from the L2 processor 1115 connected to the RRC block 1110, the MAC multiplexer 1120 attaches a proper MAC header indicating that the message included in the MAC SDU is an RRC message, so that a MAC demultiplexer 1150 in a reception device of an ENB 1135 can deliver the MAC SDU to an L2 processor 1145 connected to an RRC block 1140. However, if a MAC control message is sent over the message #3, the MAC multiplexer 1120 attaches a proper MAC header indicating that a message included in the MAC control message is a BSR message, so that the MAC demultiplexer 1150 in the reception device 1135 can deliver the MAC control message to the MAC controller 1160.

If the MAC multiplexer 1120 uses a modified MAC header for the MAC PDU being sent through the message #3 as shown in FIG. 5, i.e., uses a MAC header having only a logical channel identifier as shown by reference numeral 501, or a MAC header having only a shorter logical channel identifier as shown by reference numeral 502, the MAC multiplexer 1120, in transmitting an arbitrary MAC PDU, checks if the MAC PDU is sent through the message #3, and attaches the modified MAC header when it is sent through the message #3.

In a third embodiment of the present invention, the MAC multiplexer 1120 multiplexes the MAC SDUs provided from its upper layer, or the MAC control message generated by the MAC controller 1130, and generates a MAC PDU by attaching a proper MAC subheader thereto. In particular, in the case where the first (or initial) RRC message is transmitted through the message #3 without being contained in the MAC PDU, when the MAC PDU is sent through message #3, the MAC multiplexer 1120 uses the first bit of the MAC PDU, i.e., the first bit of the first MAC subheader as a proper format indicator for indicating whether the first RRC message is contained in the MAC PDU, and disposes the remaining MAC PDU, except for the first bit of the first MAC subheader, after the first bit of the MAC PDU. However, if the first RRC message is contained in the MAC PDU and then transmitted through the message #3, the MAC multiplexer 1120 uses the first bit of the MAC PDU as a proper format indicator for indicating if the first RRC message is contained in the MAC PDU, and disposes the first RRC message after the first bit.

In a fourth embodiment of the present invention, the MAC multiplexer 1120 multiplexes the upper layer data to the MAC PDU using a MAC PDU format designated by the MAC controller 1130. That is, if the MAC controller 1130 issues a command to use a format #1, the MAC multiplexer 1120 generates a MAC PDU using a message with a format composed of the MAC subheaders and the MAC SDU/MAC control information, and if the MAC controller 1130 issues a command to use a format #2, the MAC multiplexer 1120 generates a MAC PDU using a specific format in which a 1-bit indicator is included. The format #1 represents a normal MAC PDU format defined in the LTE system. And the format #2 represents a message format including therein information used for determining whether only the first RRC message is contained in the message #3. In addition, in the fourth embodiment of the present invention, the MAC multiplexer 1120 adds a header for the message #3 according to a header setting scheme for the message #3, designated by the MAC controller 1130.

The MAC controller 1130 is a device for controlling the MAC multiplexer 1120 and processing the MAC control message. When the random access procedure is initiated, the MAC controller 1130 controls the physical layer processor 1125 to determine a code to be used as a preamble and send a preamble coded with the code. The MAC controller 1130 forms a MAC control message, for example, a BSR message, and delivers it to the MAC multiplexer 1120. According to an embodiment of the present invention, the MAC controller 1130 delivers a format indicator indicating a format of the message #3 to the MAC multiplexer 1120 so that the MAC multiplexer 1120 can generate a message #3 depending on the format indicator. In the first embodiment of the present invention, when a BSR message occurs, the MAC controller 1130 includes it in a MAC SDU and sends the MAC SDU to the MAC multiplexer 1120, and upon receiving the MAC SDU from the MAC controller 1130, the MAC multiplexer 1120 attaches thereto a MAC header indicating that it should be processed in a MAC layer.

The MAC controller 1130 according to the second embodiment of the present invention checks if scheduling request resources are available, and if scheduling request resources are available, controls the physical layer processor 1125 to send a scheduling request. If the MAC controller 1130 is allocated UL transmission resources from the ENB, it delivers a MAC control message containing therein a BSR message to the MAC multiplexer 1120, and if scheduling request resources are unavailable, performs the random access procedure, as described above, to control the physical layer processor 1125 so that it may send a preamble coded with a selected code, and to deliver a MAC control message containing a BSR message to the RRC block 1110. Regarding the UL transmission resources, the physical layer processor 1125 can perceive these resources through the UL transmission resource information included in the message #2 received from the ENB.

The MAC controller 1130 according to the third embodiment of the present invention instructs the MAC multiplexer 1120 to use, or not to use, a format indicator. That is, for transmission of a message #3 in the random access procedure, the MAC controller 1130 instructs the MAC multiplexer 1120 to use the format indicator, or instructs the MAC multiplexer 1120 not to use the format indicator. In addition, the MAC controller 1130 acquires UL transmission resource information from the message #2 received via the physical layer processor 1125, generates a MAC control message containing the BSR information, and delivers it to the MAC multiplexer 1120. However, the MAC controller 1130 according to the fourth embodiment of the present invention compares a size of the message #3, recognized through the message #2, with a predetermined reference value X' to determine a format or header setting scheme for the message #3, and notifies the MAC multiplexer 1120 of the determined format or header setting scheme.

The physical layer processor 1125 converts the MAC PDU into a physical layer signal through a predetermined physical layer procedure and transmits the physical layer signal. Alternatively, the physical layer processor 1125 sends a preamble coded with a predetermined code, or sends a scheduling request message. The MAC controller 1130 according to the fourth embodiment of the present invention controls to send a preamble including at least one of the size of the message #3 that the UE device (transmission device) 1105 will send to perform the random access procedure, and information indicating the channel condition, to the ENB through a message #1. In response to the message #1, the MAC controller 1130 acquires at least one of the UL transmission resource information by which the UE device 1105 will send the message #3, and the size of the message #3 designated by the ENB, through the message #2 that the physical layer processor 1125 received from the ENB, compares the size of the message #3 designated by the ENB with a predetermined size, and outputs a format indicator indicating a format of the message #3 according to the comparison result. The MAC multiplexer 1120 multiplexes a MAC control message containing either a transparent RRC message delivered from its upper layer or BSR information delivered from the MAC controller 1130, generates the message #3 according to the format indicator designated by the MAC controller 1130, and delivers it to the physical layer processor 1125.

The reception device 1135, provided in the ENB, includes an RRC block 1140, an L2 processor 1145, a MAC demultiplexer 1150, a MAC controller 1160, and a physical layer processor 1155.

The RRC block 1140 is a device for processing a control message related to a radio access network. According to the second embodiment of the present invention, if a MAC container IE is contained in an RRC message received from the L2 processor 1145, the RRC block 1140 delivers the MAC container IE to the MAC controller 1160.

The L2 processor 1145 performs the operations of decrypting the RRC message received from the MAC demultiplexer 1150 and restoring a MAC SDU to its original packet. The MAC demultiplexer 1150 demultiplexes a MAC SDU and a MAC control message from the MAC PDU delivered by the physical layer processor 1155, and delivers the MAC SDU, or RRC message, to the L2 processor 1145 for a proper process, and the MAC control message to the MAC controller 1160. The physical layer processor 1155 exchanges the messages with the UE. In the first embodiment of the present invention, the MAC demultiplexer 1150 analyzes a MAC header of the MAC PDU received through the message #3 during the random access procedure to determine whether the data contained in the MAC PDU is a MAC SDU containing an RRC message or a MAC control message containing a BSR message, and delivers it to a proper device. That is, if the message contained in the MAC PDU is an RRC message, the MAC demultiplexer 1150 sends the RRC message to the RRC block 1140 via the L2 processor 1145, and if the contained message is a MAC control message, the MAC demultiplexer 1150 sends it to the MAC controller 1160.

If the MAC demultiplexer 1150 uses a modified MAC header for the MAC PDU being received through the message #3, i.e., uses a MAC header having only a logical channel identifier as shown by reference numeral 501, or a MAC header having only a shorter logical channel identifier as shown by reference numeral 502, the MAC demultiplexer 1150, in processing an arbitrary MAC PDU, checks if the MAC PDU is received through the message #3, and if it is received through the message #3, analyzes the MAC header by applying the modified MAC header format.

In the third embodiment of the present invention, the MAC demultiplexer 1150 analyzes the first bit of the message #3 received during the random access procedure to determine if only the first RRC message is contained in the message #3, and performs demultiplexing according thereto. That is, if only the first RRC message is contained in the message #3, the MAC demultiplexer 1150 delivers the remaining bits except for the first bit of the first MAC subheader of the message #3 to the RRC block 1140. If the first bit indicates that not only the first RRC message is contained in the message #3, the MAC demultiplexer 1150 analyzes MAC subheaders, including the first bit, and demultiplexes the MAC SDU or MAC control information according thereto, and delivers the result to a proper upper layer device. The MAC demultiplexer 1150 checks a format indicator of the message #3 received from the physical layer processor 1155 to determine whether a transparent RRC message is included in the message #3 or a BSR information is included in the message #3. If the BSR information is included in the message #3, the MAC demultiplexer 1150 delivers the BSR information to the MAC controller 1160, and if the transparent RRC message is included in the message #3, the MAC demultiplexer 1150 delivers the transparent RRC message to the L2 processor 1145.

The MAC controller 1160 is a device for processing a MAC control message. For example, the MAC controller 1160 can make a proper scheduling decision by analyzing the BSR message contained in the MAC control message. Although the MAC control message is delivered by the MAC demultiplexer 1150 in the first embodiment of the present invention, it can be received from the RRC block 1140 that received the RRC message, in the second embodiment of the present invention. The MAC controller 1160 receives a preamble for identifying the UE through the message #1 to perform the random access procedure, sends a message #2 including therein UL transmission resource information to the UE corresponding to the preamble, and processes the BSR information included in the message #3 received from the UE.

With reference to FIGS. 12 through 17, a description is now provided of a method and apparatus for performing the random access procedure according to the third and fourth embodiments of the present invention.

Third Embodiment

The third embodiment of the present invention provides a method for indicating if a message #3 contains only a transparent RRC message or contains a normal MAC PDU, using the first bit or first two bits (two Most Significant Bit (MSB) bits) of the message #3.

A transparent RRC message or a normal MAC PDU can be transmitted through the message #3. The normal MAC PDU is transmitted by a UE that has no scheduling request resource even though it is in the connected state, and a BSR message can be include in the MAC PDU. Since data of the totally different formats having completely different properties is transmitted through the message #3, there is a need to include separate control information in the header so that the reception device can identify the different formats.

The above-stated first embodiment of the present invention represented a shorter LCH ID as a separate control information. However, the third embodiment of the present invention defines either a 1-bit or 2-bit format indicator as a separate control information other than the LCH ID described in the first embodiment.

The term 'format indicator' as used herein refers to information indicating if the first RRC message is contained in a MAC PDU when the MAC PDU is transmitted through the message #3.

The format indicator is the first bit (1 MSB bit) or first two bits (2 MSB bits) of the message #3, and when a transparent RRC message is transmitted through the message #3, the transmission-scheduled transparent RRC message is contained (disposed) just after the format indicator. When a normal MAC PDU containing BSR is transmitted through the message #3, the first bit (1 MSB bit) or first two bits (2 MSB bits) of the first MAC subheader among the MAC subheaders constituting one MAC PDU becomes the format indicator, and the remaining MAC PDU, except for the first bit or first two bits of the first MAC subheader, is contained after the format indicator. The bit(s) where the format indicator is contained is used as a format indicator when a particular condition is satisfied. When the conditions are not satisfied, the bits are used for their conventional purpose. The term 'particular condition' as used herein refers to the case where a normal MAC PDU is sent through the message #3. Therefore, in generating a MAC subheader, the MAC multiplexer 1120 in the transmission device 1105 checks if the MAC PDU is transmitted through the message #3, and if MAC PDU is transmitted through the message #3, uses as the format indicator the first bit or first two bits of the first MAC subheader.

The MAC controller 1160 in the reception device 1135 also checks the first bit or first two bits of the data received through the message #3, and if the first bit or first two bits indicate that a transparent RRC message is contained in the message #3, the MAC controller 1160 recognizes the remaining part of the message #3 as an RRC message and delivers it to the RRC block 1140. However, if the first bit or first two bits of the message #3 indicate that a normal MAC PDU is contained in the message #3, the MAC controller 1160 in the reception device 1135, recognizing the whole of the message #3, including the first bit or first two bits, as a MAC PDU, performs the common MAC PDU process beginning from the first MAC subheader, including the first bit or first two bits. The MAC controller 1160 according to the third embodiment of the present invention receives from the UE a message #1 including a preamble used for identifying the UE via the physical layer processor 1155 to perform the random access procedure, sends a message #2 including UL transmission resource information to the UE corresponding to the preamble via the physical layer processor 1155, and processes BSR information included in the message #3 received from the UE. The physical layer processor 1155 according to the third embodiment of the present invention exchanges the message #1, message #2 and message #3 with the UE device 1105.

The MAC demultiplexer 1150 in the reception device 1135 checks a format indicator of the message #3 received from the physical layer processor 1155 to determine if a transparent RRC message is included in the message #3 or the BSR information is included in the message #3. If the BSR information is included in the message #3, the MAC demultiplexer 1150 delivers the BSR information to the MAC controller 1160, and if the transparent RRC message is included in the message #3, the MAC demultiplexer 1150 delivers the transparent RRC message to the L2 processor 1145.

Figure 12:
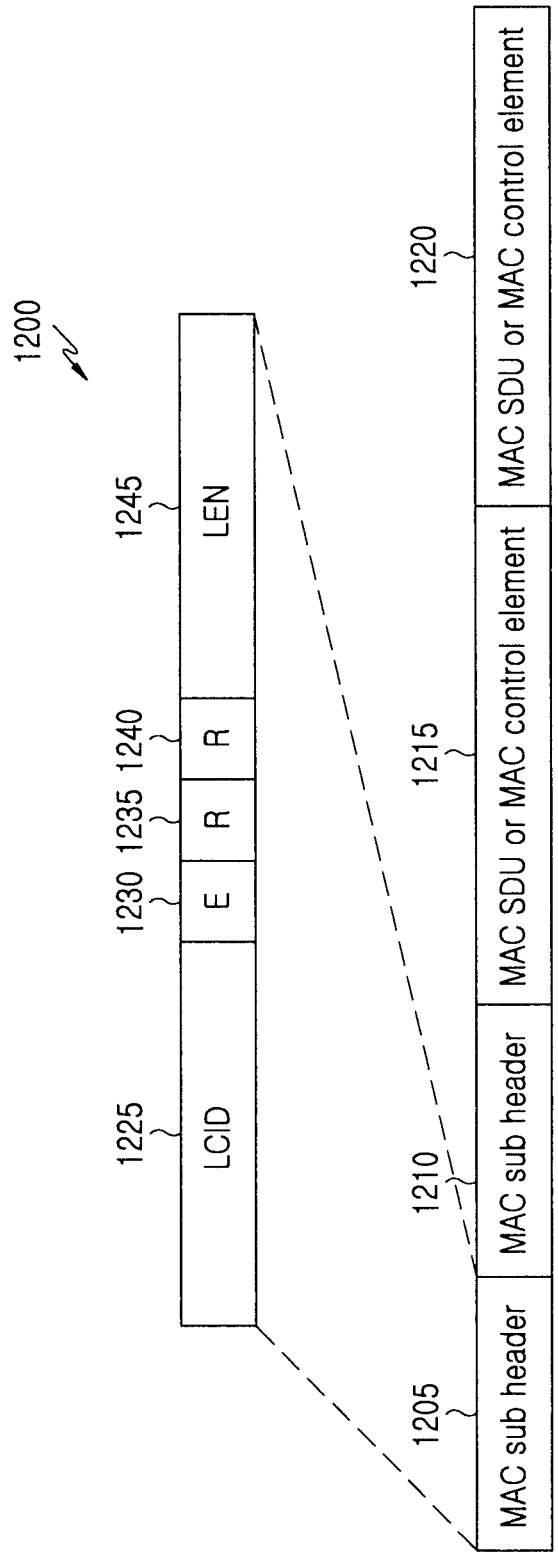
FIG. 12 is a diagram illustrating a MAC PDU format defined in the LTE system to which the present invention is applied.

In order to include the format indicator, for which the first bit (1 MSB bit) or first two bits (2 MSB bits) are used, in the normal MAC subheader, it is necessary to modify the conventional MAC header structure. With reference to FIG. 12, a description will now be made of a structure of a MAC PDU in the system to which the present invention is applied.

FIG. 12 is a diagram illustrating a MAC PDU format defined in the LTE system to which the present invention is applied.

Referring to FIG. 12, a MAC PDU 1200 is composed of multiple MAC subheaders 1205 and 1210, and multiple MAC SDU or MAC control information 1215 and 1220. The MAC subheader (e.g., 1205) contains multiplexing information for the MAC SDU or MAC control information (e.g., 1215). In other words, as many MAC subheaders as the number of MAC SDU or MAC control information contained in the MAC PDU are contained in the MAC PDU 1200. The mapping relation between the MAC subheaders and the MAC SDU or MAC control information is determined according to their contained order. For example, the first MAC subheader 1205 is associated with the first MAC SDU or MAC control information 1215, and the second MAC subheader 1210 is associated with the second MAC SDU or MAC control information 1220.

One MAC subheader contains therein fields of LCID 1225, E 1230 and LEN 1245, and non-defined R fields 1235 and 1240. LCID 1225, similar to the above-stated LCH ID, indicates a logical channel identifier of the MAC SDU and a type of the MAC control information. E 1230 is a field indicating if the corresponding MAC subheader is the last MAC subheader, and LEN 1245 is a field indicating a size of the MAC SDU or MAC control information. In order to reduce a processing load of the transmission/reception device, the MAC subheaders undergo byte alignment, and for that purpose, R bits 1235 and 1240, which are the remaining 2 reserved bits, are added.

Figure 13:
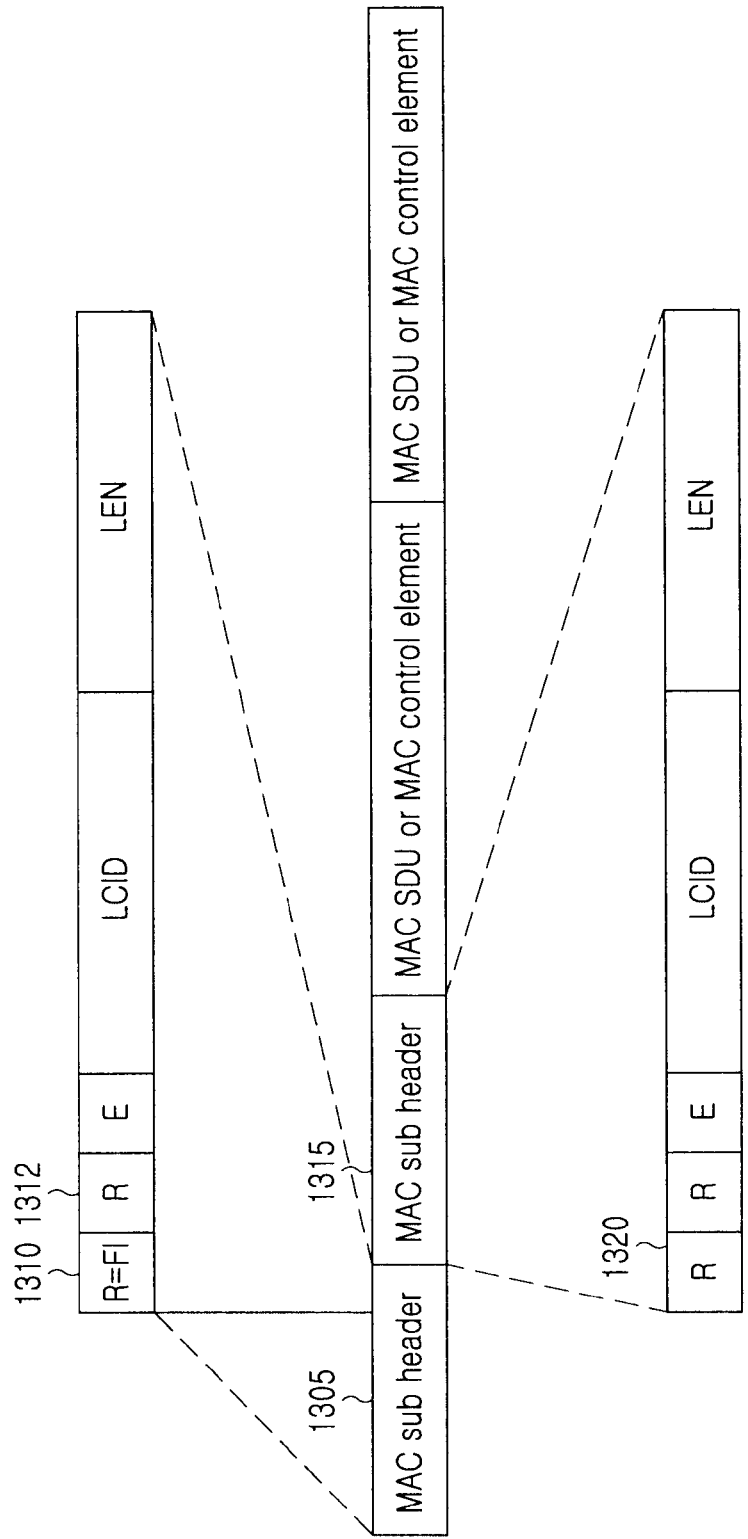
FIG. 13 is a diagram illustrating a MAC PDU format according to a third embodiment of the present invention.

The third and fourth embodiments of the present invention use one or both of the R bits as a Format Indicator (FI), and modifies the structure of the MAC subheader as shown in FIG. 13 so that the first bit or first two bits of the MAC PDU can become the format indicator.

FIG. 13 is a diagram illustrating a MAC PDU format according to the third embodiment of the present invention.

The third embodiment of the present invention, unlike in FIG. 12, moves the R bits in front of the MAC subheader as shown in FIG. 13, and uses the first R bit 1310 or the two R bits 1310 and 1312 of the first MAC subheader 1305 as a format indicator. The first R bit 1320 or the first and second R bits 1320 and 1322 of another MAC subheader other than the first MAC subheader 1305, for example, of the second MAC subheader 1315, can still be used for their own purposes. Although the R bits are fields reserved for future use, the first R bit or the first and second R bits of the remaining MAC subheaders except for the first MAC subheader 1305, if they are given a new purpose in the future, can be used for the new purpose.

For example, although the R bits can be defined to contain brief report information for the buffer status of the UE, the third embodiment of the present invention allows the first R bit or the first and second R bits of only the first MAC subheader to contain not the above-stated information but the format indicator. In order for the R bits to be more frequently used for their own purpose, it is also possible to apply the format indicator only to the MAC PDU transmitted over the message #3, rather than applying the format indicator to all MAC PDUs. That is, while the first R bit or the first and second R bits of the first MAC subheader of the MAC PDU being transmitted over the message #3 are used as a format indicator, the first R bit or the first and second R bits of the first MAC subheader of another MAC PDU will be used for their original purpose. For example, for the MAC PDU which is not transmitted through the message #3, the R bit(s) can be used as reserved bits, or can be used to contain information indicating the buffer status of the UE.

Figure 14:
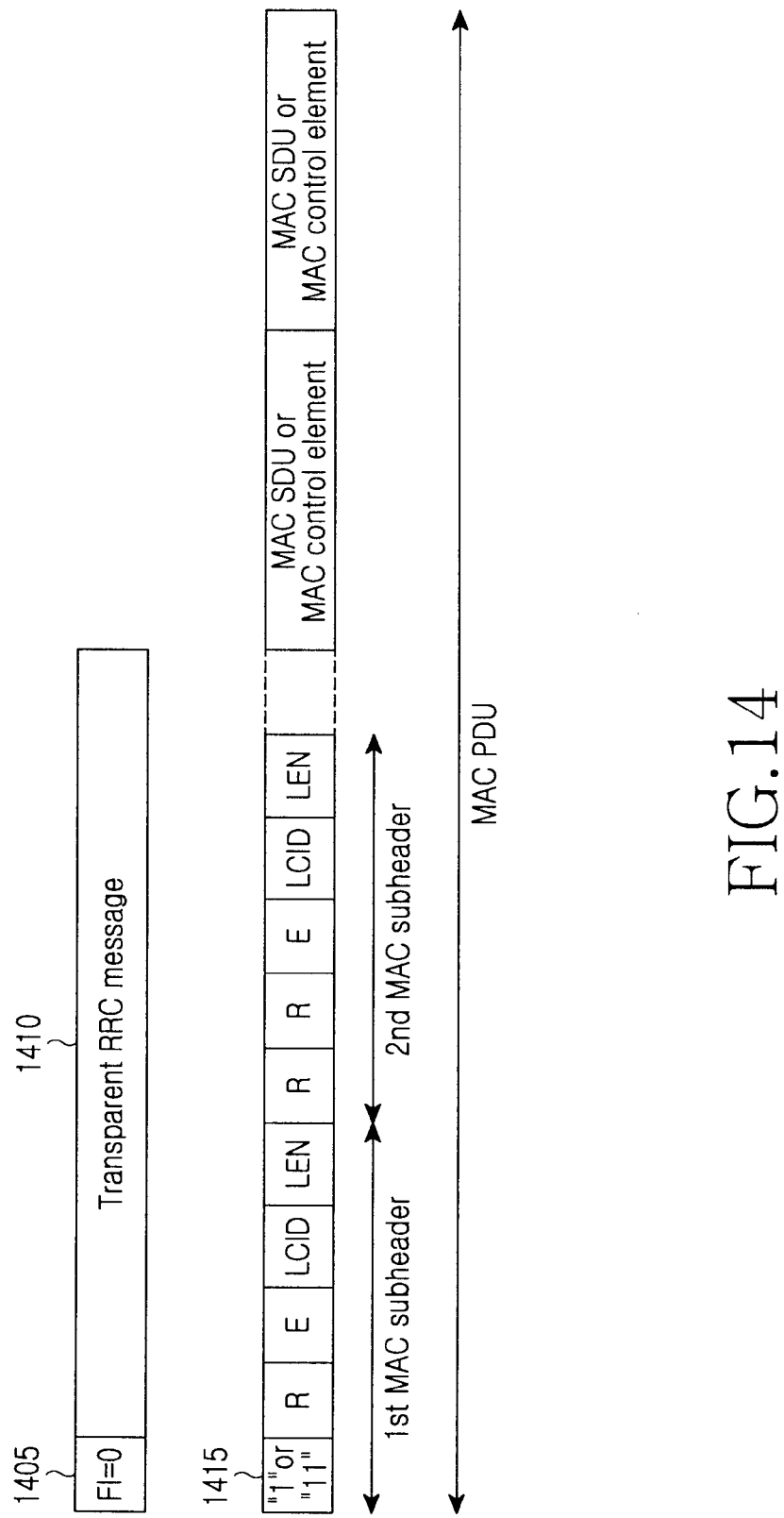
FIG. 14 is a diagram illustrating an exemplary use of a format indicator according to the third embodiment of the present invention.

FIG. 14 is a diagram illustrating an exemplary use of a format indicator according to the third embodiment of the present invention.

In FIG. 14, when a transparent RRC message is transmitted through the message #3, the message #3 is generated by setting the format indicator to "0" or to a predetermined value other than "11" as shown by reference numeral 1405, and disposing a transparent RRC message 1410 after the format indicator. However, when a normal MAC PDU is transmitted over the message #3, the format indicator is set to "1" or "11" as shown by reference numeral 1415, and the format indicator is first bit (1 MSB bit) or first two bits (2 MSB bits) of the first MAC subheader. The normal MAC PDU can contain therein MAC control information containing BSR of the UE.

That is, the 'normal MAC PDU' as used herein refers to a MAC PDU in which MAC control information containing BSR is contained, and in this case, FI is set to "1" or "11" during its transmission.

Figure 15:
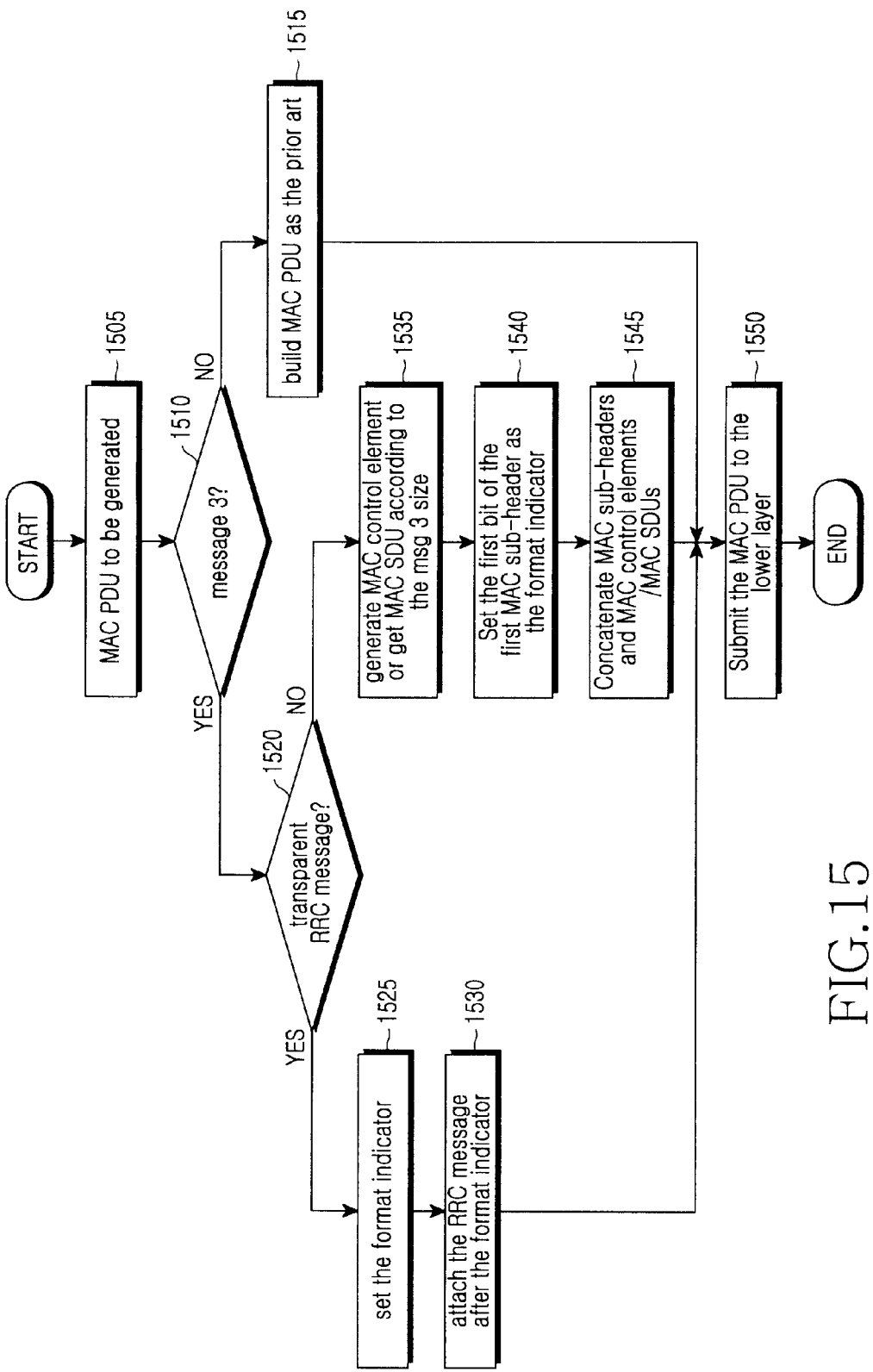
FIG. 15 is a flowchart illustrating an operation of a UE according to the third embodiment of the present invention.

FIG. 15 is a flowchart illustrating an operation of a UE according to the third embodiment of the present invention.

If a MAC PDU is generated in step 1505, the UE determines in step 1510 whether it should transmit the MAC PDU through a message #3. That is, the UE determines if the MAC PDU is generated because of transmission of the message #3 during a random access procedure. If it is determined in step 1510 that the UE will transmit the generated MAC PDU through the message #3, the UE proceeds to step 1520. Otherwise, proceeds to step 1515. In step 1515, the UE generates (builds) a MAC PDU according to the prior art, and then proceeds to step 1550 where it delivers the MAC PDU to a lower layer and then ends the process.

However, if it is determined in step 1510 that the MAC PDU is generated because of transmission of the message #3, the UE determines in step 1520 whether it will transmit a transparent RRC message through the message #3. The 'transparent RRC message' as used herein refers to an RRC message to which no RLC/MAC header is attached, and it is used herein as the same meaning as the first RRC message. The 'first RRC message' as used herein refers to an RRC message that the UE having no RRC control connection transmits for the first time, and since the first RRC message is transmitted over a common control logical channel called Common Control Channel (CCCH), it is also expressed as an RRC message being transmitted over CCCH.

Therefore, in step 1520, the UE checks if the data to be transmitted through the message #3 is an RRC message satisfying the above-stated condition (i.e. an RRC message to which no RLC/MAC header is attached, an RRC message that the UE having no RRC control connection transmits for the first time, or an RRC message being transmitted over CCCH). If the message #3 is an RRC message satisfying the condition, the UE proceeds to step 1525. Otherwise, proceeds to step 1535. In step 1525, the UE sets a format indicator to "0" or a predetermined value other than "11." As described above, the format indicator is a 1-bit or 2-bit information, and has the following meanings when it is set to "0" (or a predetermined value other than "11") and "1" (or "11").

0 (or a predetermined value other than "11") represents the condition wherein only the first RRC message is contained in the MAC PDU, and the first RRC message starts from the next bit of the format indicator.

1 (or "11") represents data other than the first RRC message is contained in the MAC PDU, and it follows a normal MAC PDU format. A format indicator is the first bit (1 MSB bit) or first two bits (2 MSB bits) of the first MAC subheader, and the remaining MAC PDU except for the first bit or first two bits of the first MAC subheader is contained from the next bit of the format indicator.

In step 1530, the UE generates the MAC PDU by attaching the first RRC message after the format indicator, and then proceeds to step 1550 where it delivers the MAC PDU in which the first RRC message is contained, to the lower layer, and then ends the process.

However, in step 1535, the UE determines information that it will include in the message #3 (or MAC PDU) according to the size of the message #3. That is, in step 1535, if the UE should include MAC control information such as BSR in the MAC PDU, it makes MAC control information, and if the UE should include MAC SDU, or upper layer data, in the MAC PDU, it receives a MAC SDU delivered from the upper layer.

In step 1540, the UE generates MAC subheaders for the MAC SDU or MAC control information that it will include in the MAC PDU. In this case, the UE uses the first bit or first two bits of the first MAC subheader as a format indicator, and sets it to a proper value, e.g., 1 or 11, according to the defined meaning of the format indicator.

In step 1545, the UE generates a MAC PDU by concatenating the MAC subheaders and the MAC SDU or MAC control information, and then proceeds to step 1550 where it delivers the MAC PDU to the lower layer and then ends the process.

Fourth Embodiment

The fourth embodiment of the present invention provides a method in which an ENB and a UE implicitly select a format of the message #3 according to a size of the message #3.

As has been previously described, in the random access procedure, the UE randomly selects one code from a set of known codes, and sends a preamble using the selected code. However, 1-bit information indicating the amount of data that the UE will transmit can be contained in the preamble together, and the ENB can allocate more transmission resources to the UE based on the information. That is, the ENB can allocate more transmission resources for transmission of the message #3 to the UE that made a report that it has much data to transmit, and can approve a greater value for the size of the message #3. The 1-bit information being transmitted in the preamble has the following meanings.

0 represents a size of the transmission message #3 that exceeds a predetermined reference value X', and its channel condition is better than a predetermined reference value Y.

1 represents a size of the transmission message #3 that is less than or equal to a predetermined reference value X', or its channel condition is worse than a predetermined reference value Y even though the amount of transmission data is greater than or equal to the predetermined reference value X'.

The reference value X' is generally set based on a size of the first RRC message. Upon receipt of a preamble where the 1 bit is set to 0, the ENB can allocate to the UE transmission resources by which the UE can transmit data of X' bytes or more. However, upon receipt of a preamble where the 1 bit is set to 1, the ENB allocates to the UE transmission resources by which the UE can transmit data of X' bytes or less.

However, since the UE transmitting the first RRC message can also transmit only the first RRC message through the message #3, the UE always sets, to '1', the 1-bit information that it transmits through the preamble, and upon detecting the preamble in which a predetermined bit is set to '1', the ENB allocates transmission resources to the UE through a message #2, by which the UE will transmit data of X' bytes or less. In other words, since transmission resources, by which the UE will transmit data of X' bytes or less, are always allocated to the UE transmitting the first RRC message, allocating transmission resources by which the UE will transmit data of X' bytes or more means that no first RRC message has been transmitted through the message #3.

That is, if the UE has reported to the ENB through the message #1 that the amount of its transmission data exceeds the reference value X' and its channel condition is better than a predetermined reference value, and thus the UE will transmit a normal MAC PDU through the message #3, a format of the message #3 follows the normal MAC PDU format. However, if the UE has reported through the message #1 that the amount of its transmission data does not exceed the reference value X' or its channel condition is worse than the predetermined reference value Y even though the amount of its transmission data exceeds the reference value X', both the first RRC message and the normal MAC PDU can be transmitted through the message #3. Therefore, the fourth embodiment of the present invention uses, as a format of the message #3, the format by which the reception device can determine whether only the first RRC message is contained in the message #3 or the normal MAC PDU is contained in the message #3. For convenience' sake, the following two formats will be defined as a format of the message #3.

Format #1: A normal MAC PDU format defined in the LTE system.

Format #2: A format including therein information used for determining whether only the first RRC message is contained in the message #3 or the normal MAC PDU is contained in the message #3. It can be either the format proposed in the first or third embodiment of the present invention, or another format satisfying the above purpose.

In addition to changing the format of the message #3 according to the predetermined condition and notifying the changed format, the fourth embodiment of the present invention can set a message header of the message #3 according to the predetermined condition and define a header setting scheme.

For example, if the UE has reported to the ENB through the message #1 that the amount of its transmission data exceeds the reference value X' and its channel condition is better than the predetermined reference value Y, since it means that the UE will transmit the normal MAC PDU defined in the LTE system through the message #3, a MAC header setting scheme for the message #3 follows the normal MAC header setting scheme defined in the LTE system. However, if the UE has reported to the ENB through the message #1 that the amount of its transmission data does not exceed the reference value X' or its channel condition is worse than the predetermined reference value Y even though the amount of its transmission data exceeds the reference value X', both the first RRC message and the normal MAC PDU can be transmitted through the message #3 by the UE.

Therefore, in setting a header of the message #3 by the UE or a transmission device, by which the ENB or a reception device can determine whether only the first RRC message is contained in the message #3 or the normal MAC PDU is contained in the message #3 according to the fourth embodiment of the present invention, the setting follows a setting scheme to which a predetermined limitation is applied. For convenience' sake, the following two types will be defined as a header setting scheme for the message #3.

Header setting scheme #1 represents a scheme for generally setting a MAC PDU header. There is no limitation in using LCH ID or R bits.

Header setting scheme #2 represents a header setting scheme which is applied only when there is a possibility that the first RRC message or normal MAC PDU will be transmitted through the message #3. There is a limitation in setting LCH ID or R bits. The header setting scheme #2 limits the use of first several bits of the MAC PDU, thereby making it possible to determine whether only the first RRC message is contained in the message #3 or the normal MAC PDU is contained in the message #3. In the following description, the header setting scheme #2 is assumed to limit the use of the first 1 bit of the MAC PDU.

For example, in the third embodiment of the present invention, the first bit of the MAC PDU is used as an R bit when it follows the header setting scheme #1 out of the above two header setting schemes, but is used as a format indicator when it follows the header setting scheme #2. As another example, when the MAC PDU header is achieved in order of LCH ID, E, R and R as shown in FIG. 12, it is possible to indicate inclusion/non-inclusion of the normal MAC PDU or the first RRC message using the first bit among the 5 bits of LCH ID. In this case, if setting the first bit to "0" indicates that the first RRC message is contained in the message #3, the transmission device following the header setting scheme #2, when the normal MAC PDU is transmitted through the message #3, should follow the restrictions that the first bit of LCH ID of the first MAC subheader should be set to '1', in other words, a MAC SDU having LCH ID between 16~31 should be contained in the first MAC SDU of the MAC PDU.

Summarizing the fourth embodiment of the present invention, when the UE has reported through its transmission preamble that the amount of its transmission data exceeds a predetermined reference value and its channel condition is better than a predetermined reference value, the UE and the ENB use the format #1 or the header setting scheme #1 for the message #3, and otherwise, use the format #2 or the header setting scheme #2 for the message #3.

As another method according to the fourth embodiment of the present invention, when the UE transmits a size of its desired transmission message #3 through the message #1 and upon receipt of the message #1, the ENB orders the UE through the message #2 to designate the size of the message #3 as a predetermined reference value or more, the UE and the ENB set a header of the message #3 using the format #1 as a format of the message #3 or using the header setting scheme #1, and otherwise, set a header of the message #3 using the format #2 as a format of the message #3 or using the header setting scheme #2.

Compared with the first method for implicitly determining the format of the message #3 based on a size of the message #3 that the UE reported through the preamble, the second method in which the ENB implicitly determines the format of the message #3 through the contents of the message #2 including therein the size of the message #3 that the UE desires to transmit, can be more robust, and the fourth embodiment of the present invention considers both of the two methods.

Figure 16:
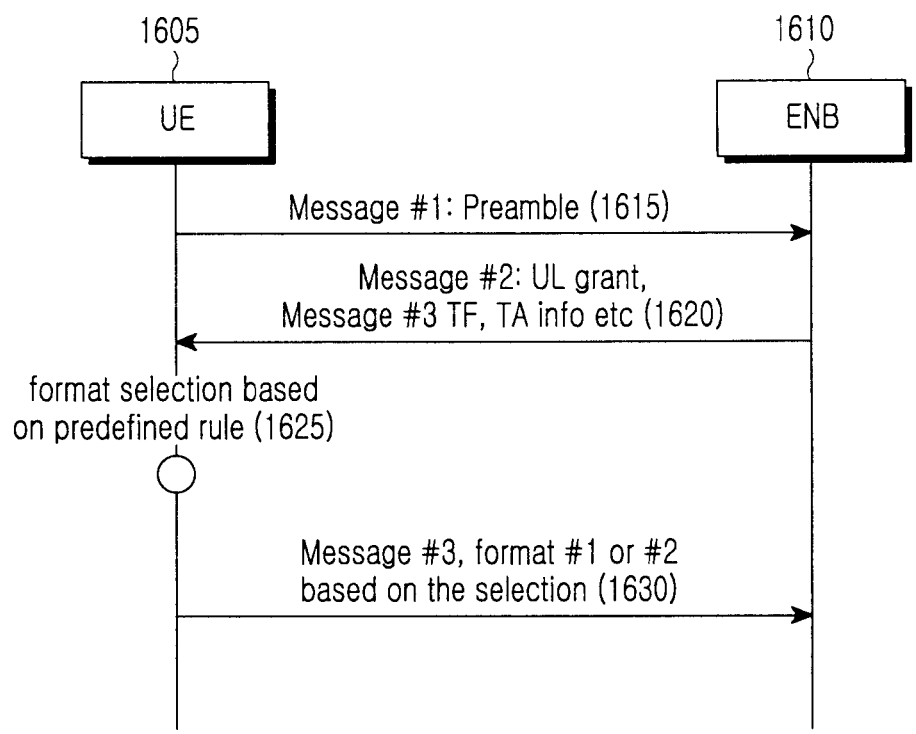
FIG. 16 is a signaling diagram illustrating operations of a UE and an ENB according to a fourth embodiment of the present invention.

FIG. 16 is a signaling diagram illustrating operations of a UE and an ENB according to the fourth embodiment of the present invention.

In step 1615, a UE 1605 starts a random access procedure if a predetermined condition is satisfied. That is, if a predetermined condition is satisfied, the UE 1605 selects one code from a set known of codes, and sends a preamble using the selected code. In this case, the preamble contains both of a size of the data that the UE 1605 will transmit through the message #3, and the 1-bit information for the channel condition.

Upon receipt of a message #1 including the preamble that the UE 1605 transmitted in step 1615, an ENB 1610 sends in step 1620 a message #2 containing UL TA information and UL grant information including therein the size of the message #3 and UL transmission resource information with which the UE 1605 transmits the message #3, to the UE 1605 in response to the message #1. Upon receipt of the message #2 in step 1620, the UE perceives the size of the message #3 and transmission resources over which it will transmit the message #3, and determines in step 1625 a format of the message #3 or a header setting scheme of the message #3. As described above, the format of the message #3 or the header setting scheme of the message #3 is implicitly determined according to the size of the message #3 or the information that the UE reported through the message #1. If an agreement is made between the UE and the ENB to use the format #1 or the header setting scheme #1 when the size of the message #3 is greater than or equal to a predetermined reference value, the UE checks the size of the message #3 that the ENB wants to receive through the message #2, and compares the checked size of the message #3 with a predetermined reference value. If the size of the message #3, checked through the message #2, is greater than the reference value, the UE uses the format #1 as a format of the message #3 or uses the header setting scheme #1 as a header setting scheme of the message #3, and otherwise, the UE uses the format #2 as a format of the message #3 or uses the header setting scheme #2.

The information reported through the message #1 is the size of the message #3 that the UE wants to transmit, and the size of the message #3 that the ENB transmitted through the message #2 is the size of the message #3 that the UE is instructed to transmit by the ENB. However, if an agreement is made between the UE and the ENB to use the format #1 or the header setting scheme #1 when the UE has reported to the ENB through the message #1 that the size of the message #3 that it desires to transmit is greater than or equal to a predetermined reference value and its channel condition is better than a predetermined reference value, the UE determines the format or header setting scheme of the message #3 according to the size of the message #3 and the channel condition reported through the message #1.

In step 1630, the UE generates the message #3 using the format determined in step 1625, or generates the message #3 using the header setting scheme determined in step 1625, and then sends the generated message #3 to the ENB. The ENB also determines the format of the message #3 or the header setting scheme applied to the message #3 by applying the same rule as that used in the UE, and processes a MAC PDU or first RRC message contained in the message #3 using the format or header setting scheme.

Figure 17:
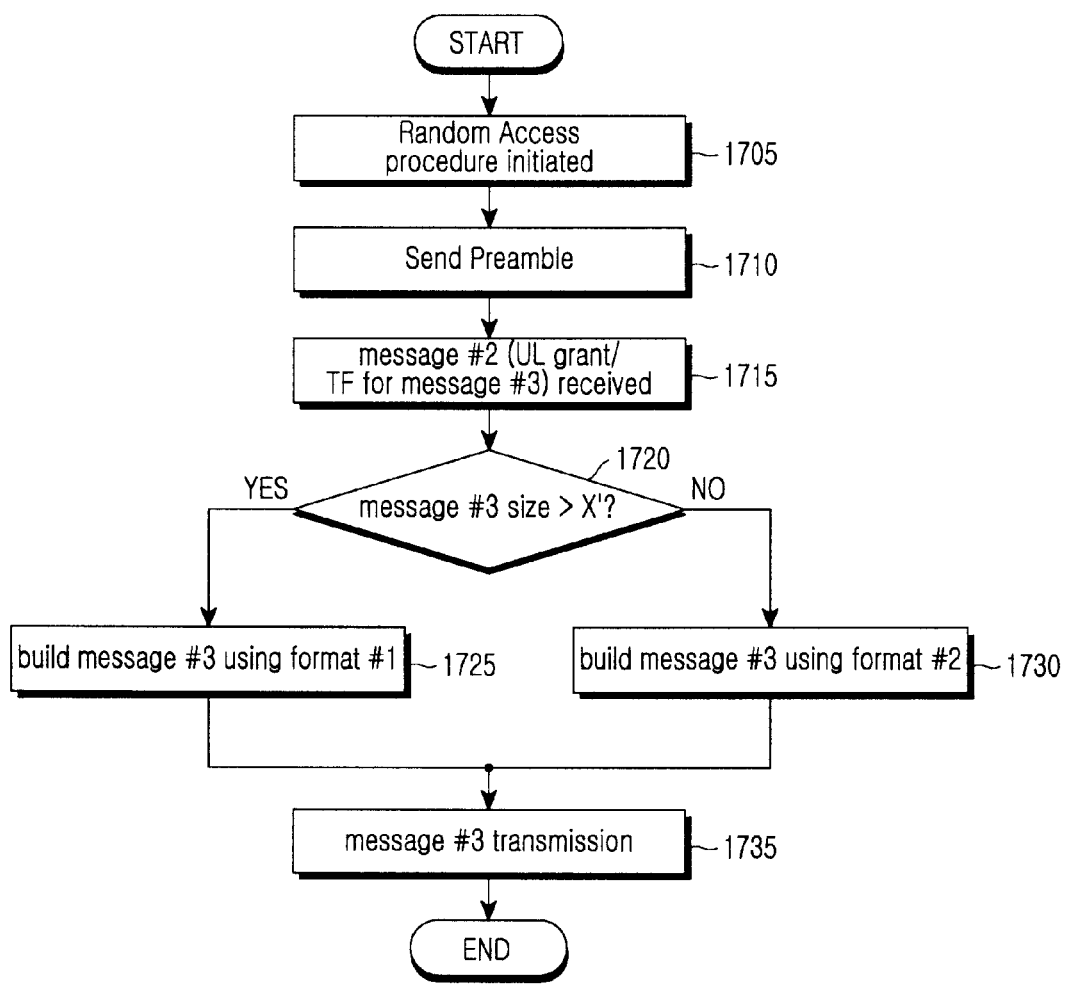
FIG. 17 is a flowchart illustrating an operation of a UE according to the fourth embodiment of the present invention.

FIG. 17 is a flowchart illustrating an operation of a UE according to the fourth embodiment of the present invention.

In step 1705, the UE initiates a random access procedure when a predetermined condition is satisfied, for example, when the UE transitions from the idle state to the connected state or transmits UL data. In step 1710, the UE sends a preamble to an ENB through a predetermined procedure of selecting one code from a predetermined set of codes, in order to perform the random access procedure. The preamble can include therein both the 1-bit information indicating the channel condition and the size of the message #3 that the UE will transmit.

After sending the preamble in step 1710, the UE waits to receive the message #2 that will be transmitted over DL from the ENB through a predetermined procedure. Upon receiving the message #2 from the ENB in step 1715, the UE checks UL transmission resource information, contained the message #2, by which it will transmit the message #3, and size information of the message #3 that the ENB wants to receive. In step 1720, the UE selects a format of the message #3 or a header setting scheme that it will apply to the message #3. That is, if it is determined through the message #2 in step 1720 that the size of the message #3 that the ENB wants to receive exceeds a predetermined reference value X', the UE proceeds to step 1725 where it generates the message #3 using the format #1 or generates the message #3 using the header setting scheme #1. However, if it is determined in step 1720 that the size of the message #3, checked through the message #2 received in step 1715, is less than or equal to the predetermined reference value X', the UE proceeds to step 1730 where it the message #3 using the format #2 or the header setting scheme #2.

Alternatively, if the UE has reported through the preamble in step 1710 that the size of the message #3 exceeds the predetermined reference value X' and its channel condition is better than the predetermined reference value Y, the UE proceeds to step 1725 where it generates the message #3 by setting a header of the message #3 using the format #1 or the header setting scheme #1. Otherwise, the UE proceeds to step 1730 where it generates the message #3 using the format #2. In the present invention, the X' is determined as a size of the message that the ENB can receive from the UE located in the cell boundary without difficulty, and it can be determined through the field test. In step 1725, the UE generates the message #3 using a normal MAC PDU format, i.e., the normal MAC PDU format including no 1-bit indicator, described in step 1730, and then proceeds to step 1735 where it sends the message #3 generated in step 1725. Alternatively, in step 1725, in setting a header using the header setting scheme #1, the UE sets a header of the message #3 using the normal scheme without separate limitation, and then generates and transmits the message #3 in step 1735.

In step 1730, the UE generates the message #3 using the format #2, for example, using the MAC PDU format including a 1-bit indicator, which is proposed by the fourth embodiment of the present invention, and then proceeds to step 1735 where it transmits the message #3 generated in step 1730. The 1-bit indicator is a value indicating whether only the first RRC message is contained in the message #3 (or MAC PDU), and whether the 1-bit indicator indicates that only the first RRC message is contained in the message #3 or MAC PDU, only the 1-bit indicator and the first RRC message are contained in the message #3 or MAC PDU, and the RRC message is contained just after the 1-bit indicator. However, if the 1-bit indicator indicates that not only the first RRC message is contained in the message #3 or MAC PDU, the first bit of the message #3 or MAC PDU is the 1-bit indicator and the normal MAC PDU can be contained in the remaining part. Also, the first bit of the message #3 can be the 1-bit indicator as presented in the third embodiment of the present invention. In this case, it is the first bit of the first MAC subheader, and the remaining MAC PDU except for the first bit of the first MAC subheader can be contained in the remaining part.

Alternatively, in step 1730, the UE generates a header of the message #3 using the header setting scheme #2, and then proceeds to step 1735 where it transmits the message #3 generated in step 1730.

As is apparent from the foregoing description, according to the present invention, in transmitting its BSR message to the ENB, the UE which is allocated no scheduling request resource can efficiently use the UL transmission resources by using no L2 header or reducing the size of the header. Further, according to the present invention, the UE which performs the random access procedure can efficiently transmit the MAC PDU or transparent RRC message through the message #3.

The above-described methods according to the present invention can be realized in hardware or as software or computer code that can be stored in a recording medium such as a CD ROM, an RAM, a floppy disk, a hard disk, or a magneto-optical disk or downloaded over a network, so that the methods described herein can be executed by such software using a general purpose computer, or a special processor or in programmable or dedicated hardware, such as an ASIC or FPGA. As would be understood in the art, the computer, the processor or the programmable hardware include memory components, e.g., RAM, ROM, Flash, etc. that may store or receive software or computer code that when accessed and executed by the computer, processor or hardware implement the processing methods described herein.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for performing a random access procedure by a User Equipment (UE) in a mobile communication system, the method comprising:
   transmitting a preamble to identify the UE via a first message;
   receiving a second message from an Evolved Node B (ENB) in response to the first message, the second message including uplink (UL) transmission resource information for transmitting at least one of a transparent Radio Resource Control (RRC) message, which is an RRC message that a UE having no RRC control connection transmits for the first time, and Buffer Status Report (BSR) information indicating an amount of UL data;
   generating a third message with a format indicator; and
   transmitting the generated third message responsive to the second message based on the UL transmission resource information,
   wherein the format indicator is set to a first value if the transparent RRC message is part of the third message and is set to a second value if the BSR information is part of the third message.

2. The method of claim 1, wherein when the transparent RRC message is included in the third message, the format indicator includes a first bit of a first Medium Access Control (MAC) subheader of the third message, and the transparent RRC message is provided after the format indicator.

3. The method of claim 1, wherein when the transparent RRC message is included in the third message, the format indicator includes first two bits of a first MAC subheader of the third message, and the transparent RRC message is provided after the format indicator.

4. The method of claim 1, wherein when the BSR information is included in the third message, a first bit of a first MAC subheader of a MAC Packet Data Unit (PDU) transmitted via the third message is set as the format indicator indicating that the transparent RRC message is not included in the third message, and the BSR information is provided after the format indicator.

5. The method of claim 1, wherein when the BSR information is included in the third message, first two bits of a first MAC subheader of a MAC PDU transmitted through the third message are set as the format indicator indicating that the transparent RRC message is not included in the third message, and the BSR information is provided after the format indicator.

6. The method of claim 1, wherein the random access procedure is performed without a scheduling resource request allocated to the UE.

7. A User Equipment (UE) apparatus for performing a random access procedure in a mobile communication system, comprising:
- a physical layer processor configured to exchange messages with an Evolved Node B (ENB);
- a Medium Access Control (MAC) controller configured to control transmitting a preamble to the ENB via a first message, acquire uplink (UL) transmission resource information from the ENB in response to the first message via a second message that the physical layer processor received from the ENB, the UL transmission resource information being used for transmitting at least one of a transparent Radio Resource Control (RRC) message indicating that a UE having no RRC control connection transmits for the first time, and Buffer Status Report (BSR) information indicating an amount of UL data, generate a MAC control message containing therein the BSR information, and output a format indicator as part of a third message, indicating whether the transparent RRC message or the BSR information is included in the third message, the third message being transmitted responsive to the second message using the UL transmission resource information; and
- a MAC multiplexer configured to multiplex a MAC control message including at least one of the transparent RRC message delivered from an upper layer and the BSR information delivered from the MAC controller, and generate the third message based on the format indicator designated by MAC controller,
- wherein the format indicator is set to a first value if the transparent RRC message is part of the third message and is set to a second value if the BSR information is part of the third message.

8. The UE apparatus of claim 7, wherein when the transparent RRC message is included in the third message, the format indicator includes a first bit of a first MAC subheader of the third message, and the transparent RRC message is provided after the format indicator.

9. The UE apparatus of claim 7, wherein when the transparent RRC message is included in the third message, the format indicator includes first two bits of a first MAC subheader of the third message, and the transparent RRC message is provided after the format indicator.

10. The UE apparatus of claim 7, wherein when the BSR information is included in the third message, a first bit of a first MAC subheader of a MAC Packet Data Unit (PDU) transmitted through the third message is set as the format indicator indicating that the transparent RRC message is not included in the third message, and the BSR information is provided after the format indicator.

11. The UE apparatus of claim 7, wherein when the BSR information is included in the third message, first two bits of a first MAC subheader of a MAC PDU transmitted through the third message are set as the format indicator indicating that the transparent RRC message is not included in the third message, and the BSR information is provided after the format indicator.

12. The UE apparatus of claim 7, wherein the random access procedure is performed without a scheduling resource request allocated to the UE.

13. A method for performing a random access procedure by an Evolved Node B (ENB) in a mobile communication system, the method comprising:
- receiving a preamble for identifying a User Equipment (UE), from the UE via a first message;
- transmitting uplink (UL) transmission resource information via a second message in response to the first message, the UL transmission resource information being used for transmitting at least one of a transparent Radio Resource Control (RRC) message indicating that a UE having no control connection transmits for the first time and a Buffer Status Report (BSR) information indicating an amount of UL data;
- receiving a third message transmitted in response to the second message, through the UL transmission resource information;
- checking a format indicator of the third message, indicating if the third message includes the transparent RRC message or the BSR information; and
- processing the third message in an RRC layer or a Medium Access Control (MAC) layer based on a set value of the format indicator,
- wherein the format indicator is set to a first value if the transparent RRC message is part of the third message and is set to a second value if the BSR information is part of the third message.

14. The method of claim 13, wherein the processing comprises:
- when the format indicator indicates that the transparent RRC message is included in the third message, processing the third message in the RRC layer.

15. The method of claim 13, wherein the processing comprises:
- when the format indicator indicates that the BSR information is included in the third message, processing the third message in the MAC layer.

16. The method of claim 13, wherein when the transparent RRC message is included in the third message, the format indicator includes a first bit of a first MAC subheader of the third message, and the transparent RRC message is provided after the format indicator.

17. The method of claim 13, wherein when the BSR information is included in the third message, a first bit of a first MAC subheader of a MAC Packet Data Unit (PDU) transmitted through the third message is set as the format indicator indicating that the transparent RRC message is not included in the third message, and the BSR information is provided after the format indicator.

18. An Evolved Node B (ENB) apparatus for performing a random access procedure in a mobile communication system, comprising:
- a Medium Access Control (MAC) controller configured to receive a preamble for identifying a User Equipment (UE) from the UE via a first message to perform the random access procedure, transmit a second message including therein uplink (UL) transmission resource information to the UE corresponding to the preamble, and process Buffer Status Report (BSR) information included in a third message received from the UE responsive to the second message;
- a physical layer processor configured to exchange the first message, the second message and the third message with the UE; and
- a MAC demultiplexer configured to check a format indicator of the third message received from the physical layer processor to determine if a transparent Radio Resource Control (RRC) message is included in the third message or the BSR information is included in the third message, deliver the BSR information to the MAC controller if the BSR information is included in the third message, and deliver the transparent RRC message to a Layer 2 (L2) processor if the transparent RRC message is included in the third message, wherein the transparent RRC message indicates that a UE having no RRC control connection to the ENB transmits for the first time, and the BSR information indicates an amount of UL data, and wherein the format indicator is set to a first value if the transparent RRC message is part of the third message and is set to a second value if the BSR information is part of the third message.

19. The ENB apparatus of claim 18, wherein when the transparent RRC message is included in the third message, the format indicator includes a first bit of a first MAC subheader of the third message, and the transparent RRC message is provided after the format indicator.

20. The ENB apparatus of claim 18, wherein when the BSR information is included in the third message, a first bit of a first MAC subheader of a MAC Packet Data Unit (PDU) transmitted via the third message is set as the format indicator indicating that the transparent RRC message is not included in the third message, and the BSR information.

* * * * *